United States Patent
Tsuru et al.

(10) Patent No.: US 6,176,524 B1
(45) Date of Patent: Jan. 23, 2001

(54) OIL WELL PIPE THREADED JOINT

(75) Inventors: Eiji Tsuru, Futtsu; Masaharu Oka; Kazushi Maruyama, both of Kitakyushu, all of (JP)

(73) Assignee: Nippon Steel Corporation, Tokyo (JP)

( * ) Notice: Under 35 U.S.C. 154(b), the term of this patent shall be extended for 0 days.

(21) Appl. No.: 08/688,483

(22) Filed: Jul. 30, 1996

(30) Foreign Application Priority Data

Aug. 19, 1995 (JP) .................................................... 7-233473
Aug. 22, 1995 (JP) .................................................... 7-237809

(51) Int. Cl.$^7$ ............................................................ F16L 9/14
(52) U.S. Cl. ............................ 285/55; 285/334; 285/355; 285/369; 285/910
(58) Field of Search .................................. 285/355, 333, 285/334, 55, 369, 349, 350, 910

(56) References Cited

U.S. PATENT DOCUMENTS

| | | | |
|---|---|---|---|
| 2,102,072 | * 12/1937 | Hinderliter | 285/333 X |
| 3,100,656 | * 8/1963 | MacArthur | 285/333 X |
| 3,307,860 | * 3/1967 | Blount et al. | 285/334 X |
| 3,572,777 | * 3/1971 | Blose | 285/334 |
| 4,568,113 | * 2/1986 | Axford et al. | 285/334 |
| 4,705,307 | * 11/1987 | Chelette | 285/334 X |
| 4,712,815 | * 12/1987 | Reeves | 285/334 |
| 5,169,183 | * 12/1992 | Hallez | 285/334 |

FOREIGN PATENT DOCUMENTS

| | | | |
|---|---|---|---|
| 94509 | * 11/1983 | (EP) | 285/333 |
| 212228 | * 3/1987 | (EP) | 285/334 |
| 500482 | * 8/1992 | (EP) | 285/334 |
| 380450 | * 9/1932 | (GB) | 285/333 |
| 8704505 | * 7/1987 | (WO) | 285/334 |

* cited by examiner

*Primary Examiner*—Dave W. Arola
(74) *Attorney, Agent, or Firm*—Kenyon & Kenyon

(57) ABSTRACT

This invention provides an oil well pipe threaded joint capable of preventing looping and squeezing of a soft synthetic resin ring and consequently, preventing catching of a tool during a logging operation and damage such as corrosion by a corrosive fluid, the oil well pipe threaded joint employs the construction wherein a soft synthetic resin ring is interposed between distal end surfaces of pins, each step surface of a shoulder portion on an inner peripheral side of a coupling and a step surface of each pin are brought into abuttment, and each inside thread of the coupling of the coupling and each outside thread of each pin are engaged, wherein a compressive ratio of the soft synthetic resin ring in an axial direction falls within the range expressed by an inequality $$18,000/E \leq \text{compressive ratio } (\%) < 0.038^{-1} \times 1n[1-\{(d_1-d_2)+0.36\}/0.25t_1]$$

(where $d_1$: inside diameter of pin,
$d_2$: inside diameter of soft synthetic resin ring,
$t_1$: thickness of distal end of pin).

10 Claims, 25 Drawing Sheets

STRESS CONCENTRATION

STRESS RELIEF GROOVE

REDUCING STRESS CONCENTRATION

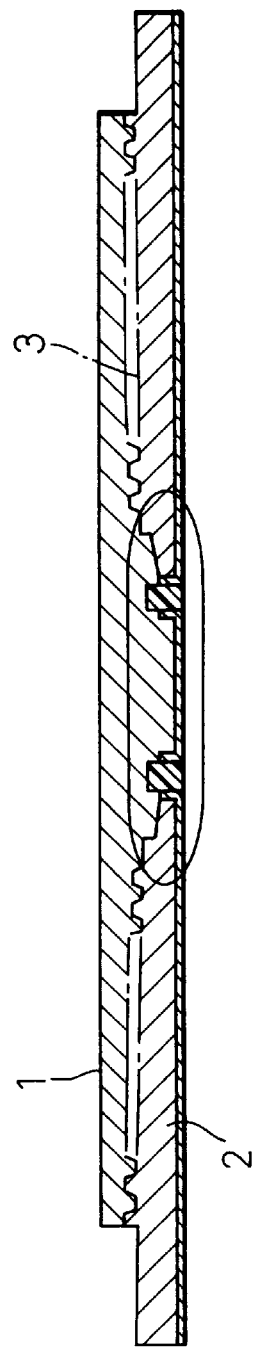
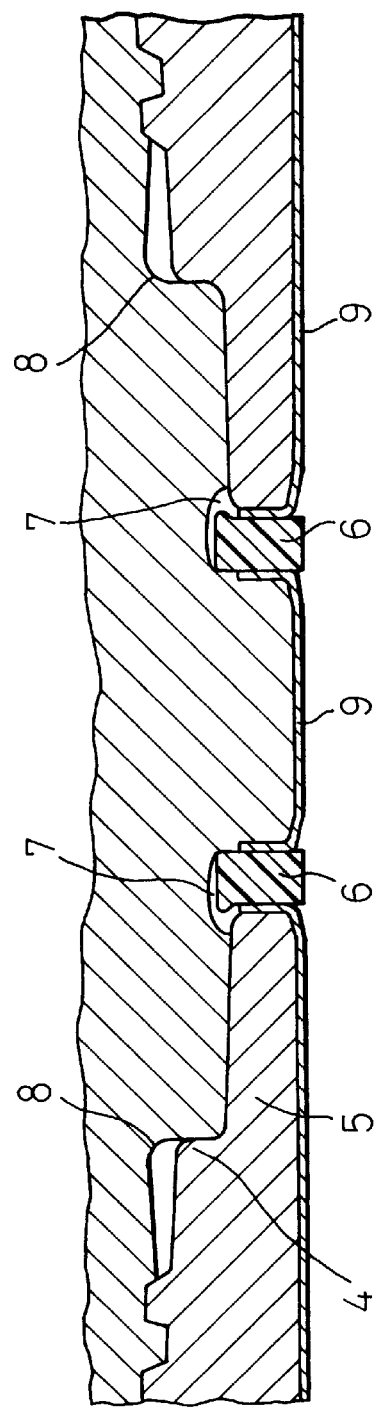

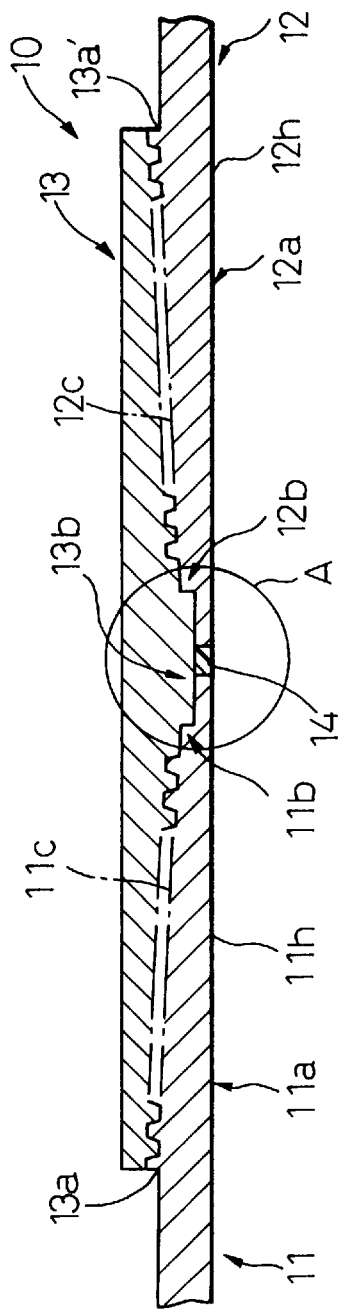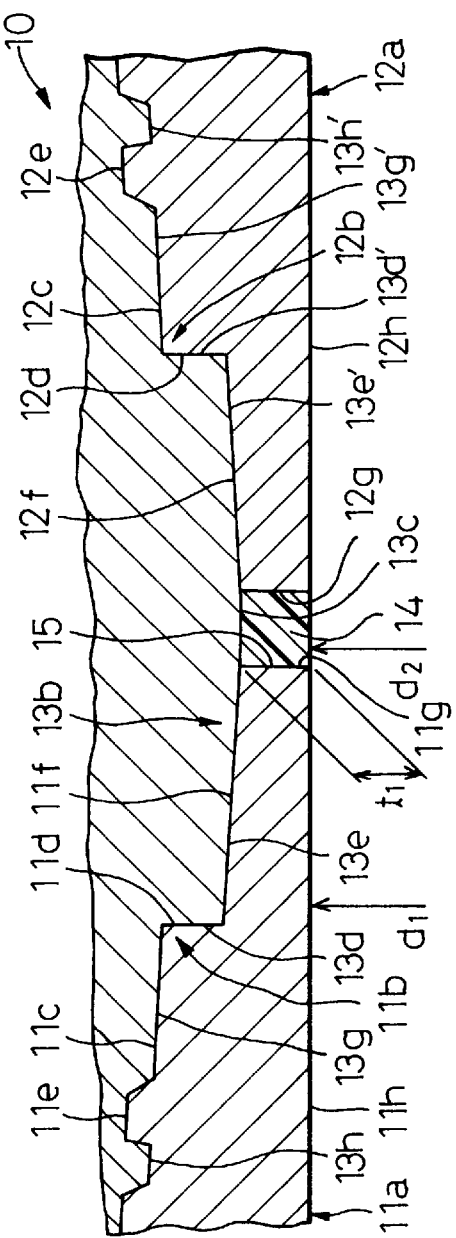

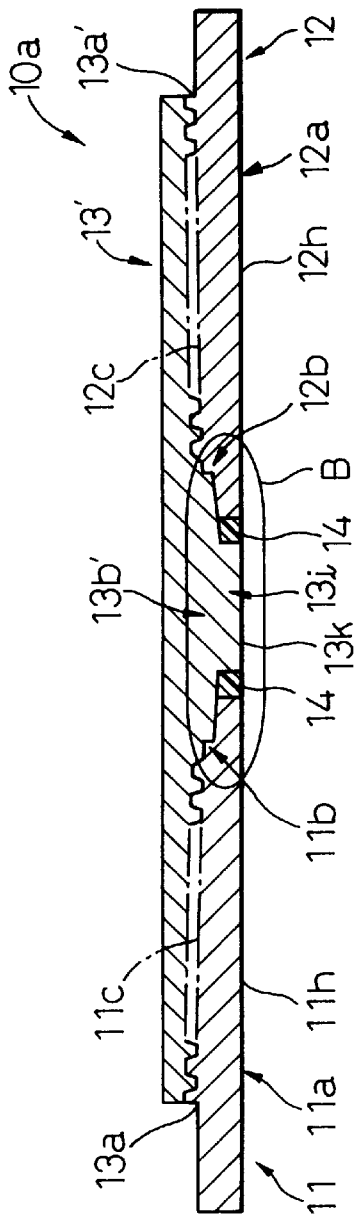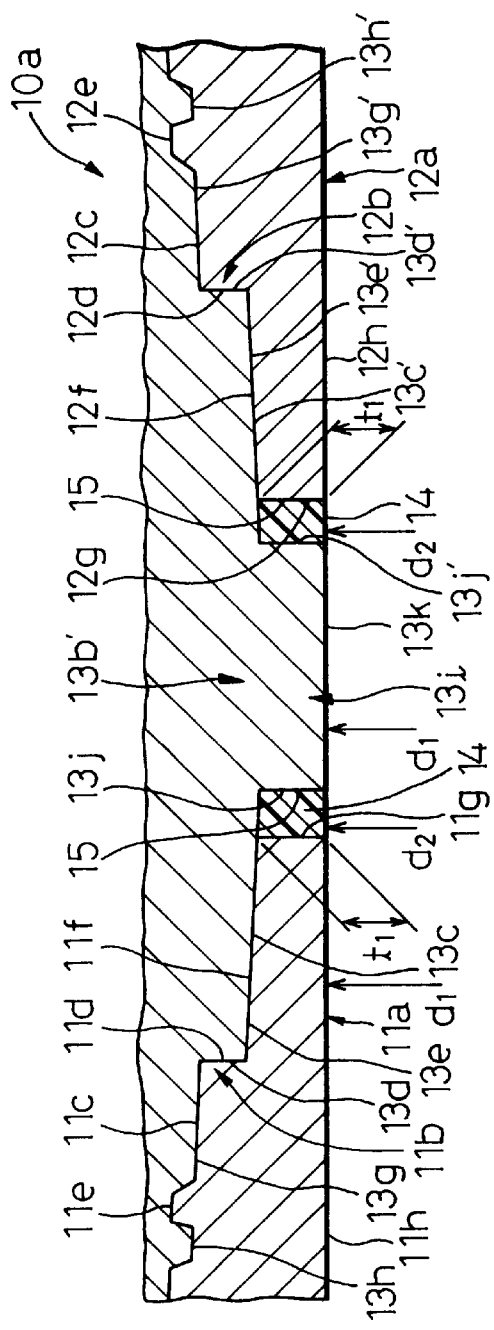

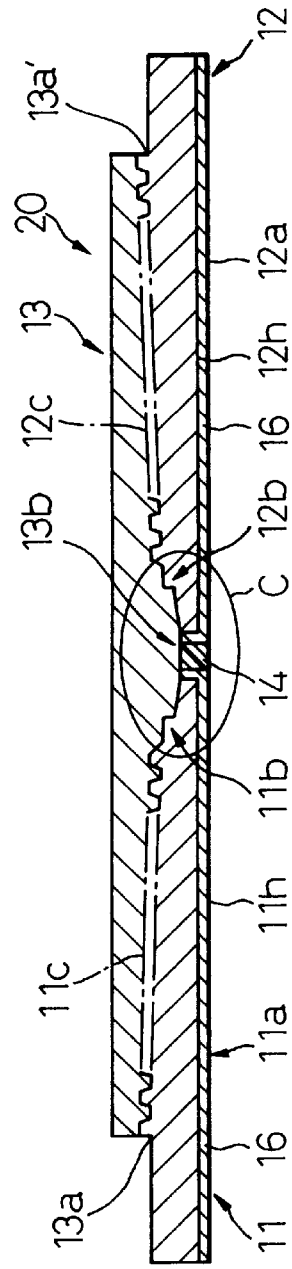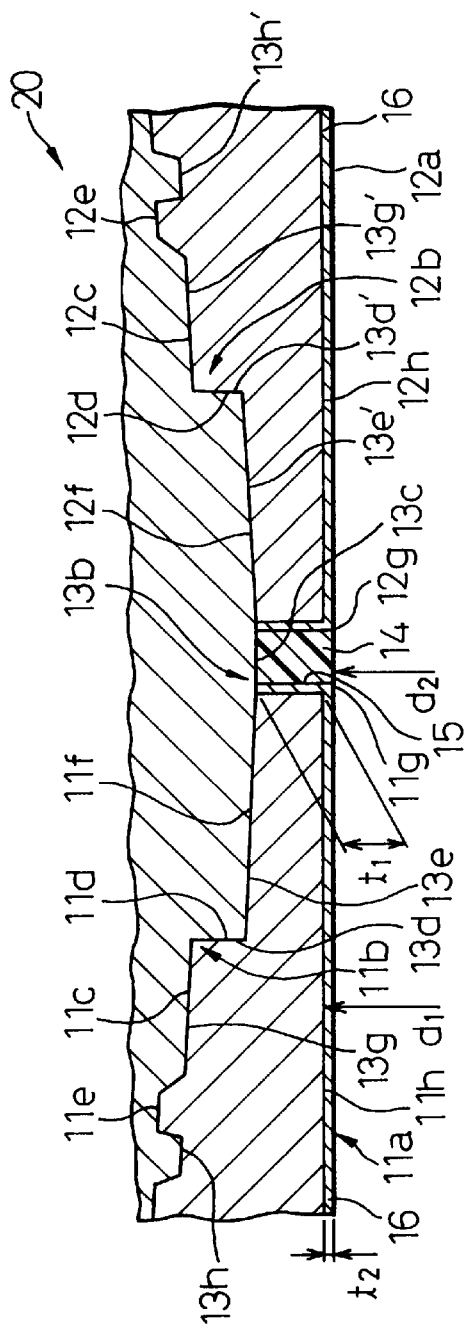

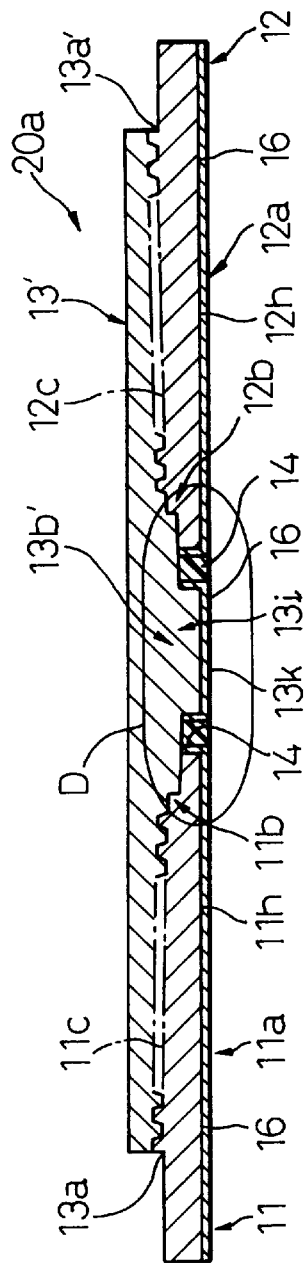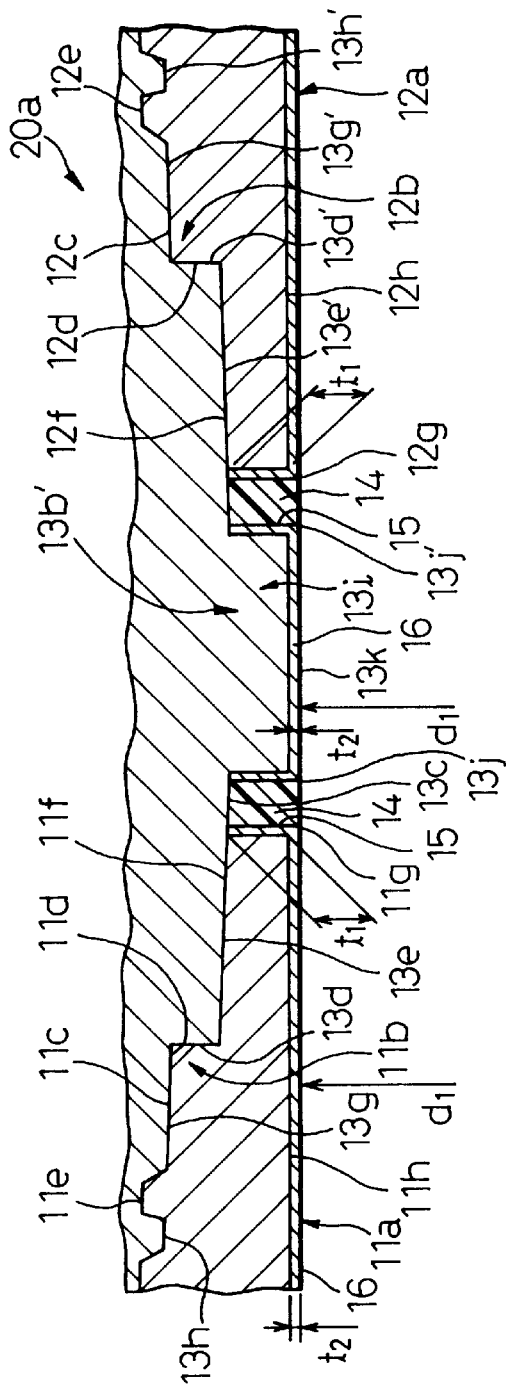
Fig.14(a)
Fig.14(b)

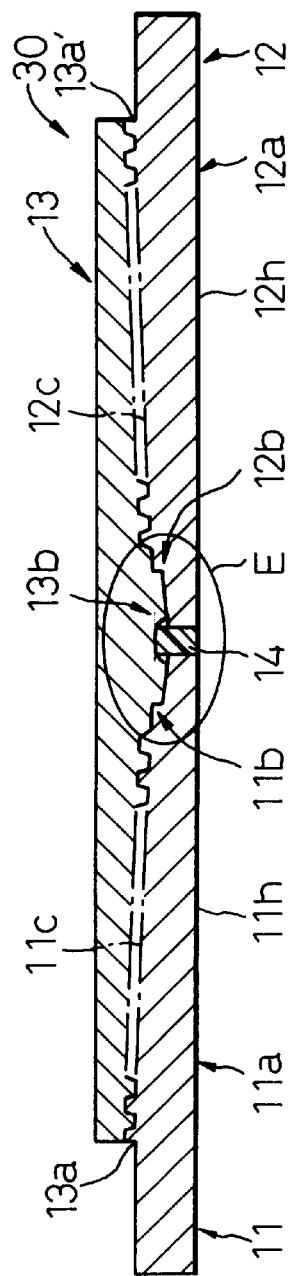
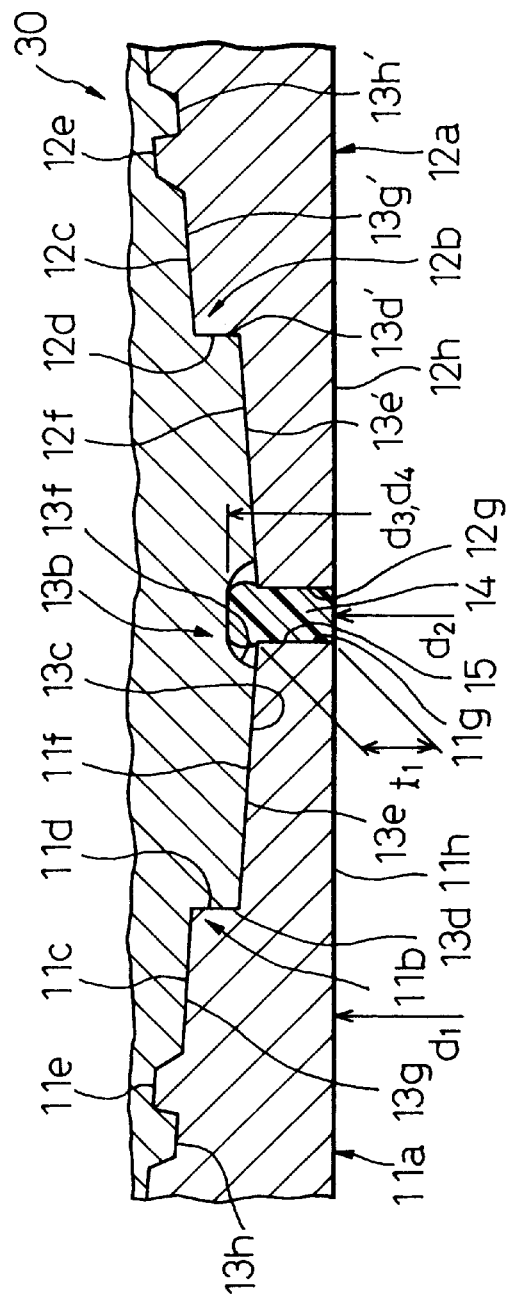

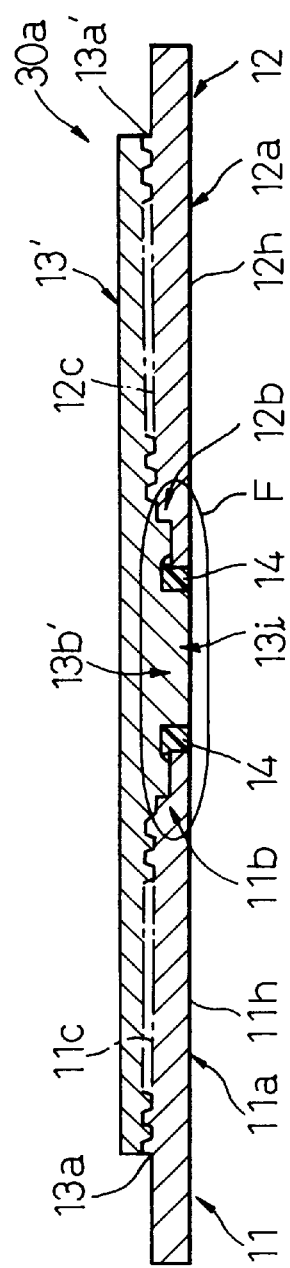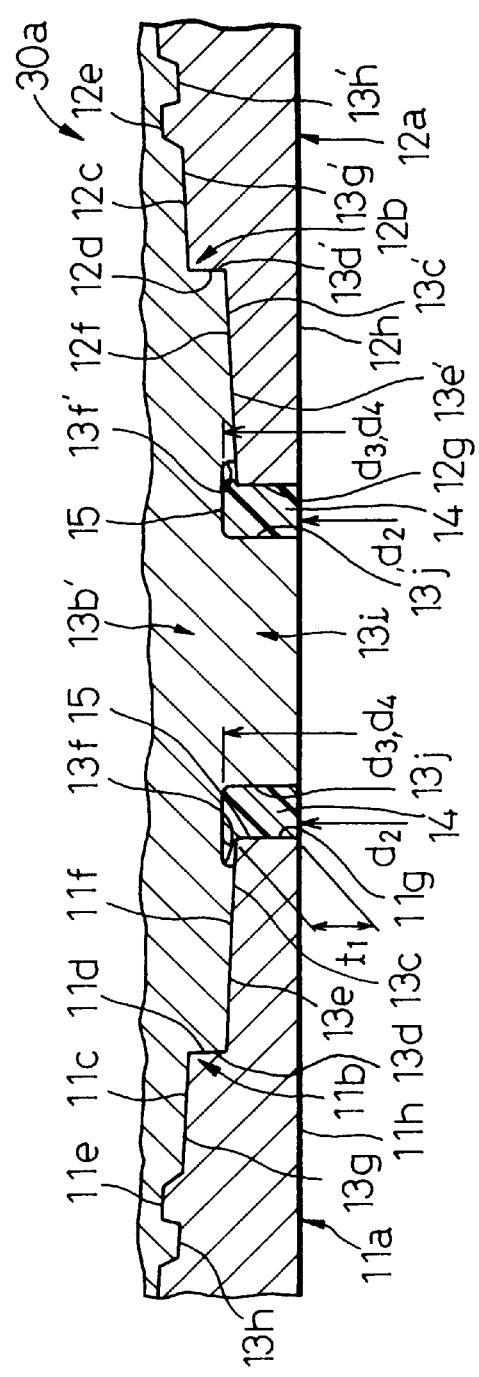

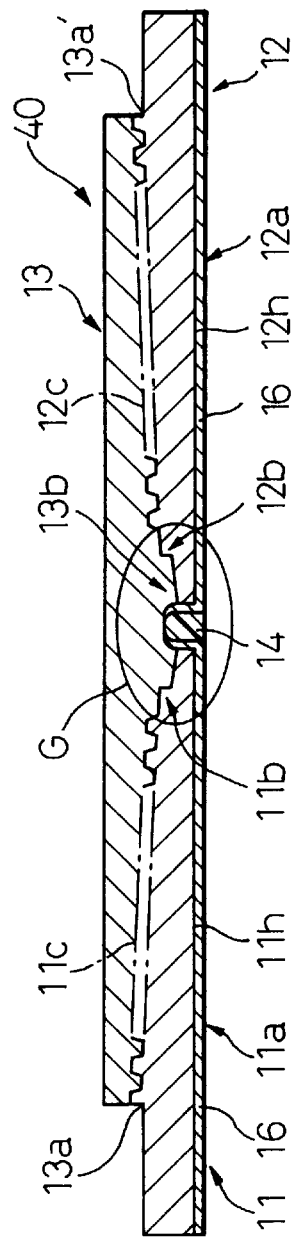
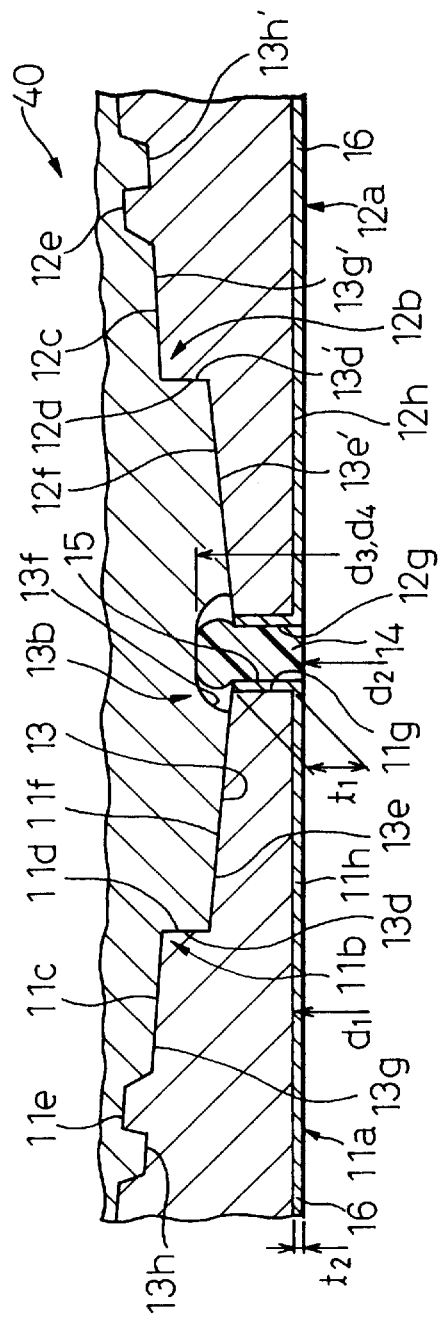

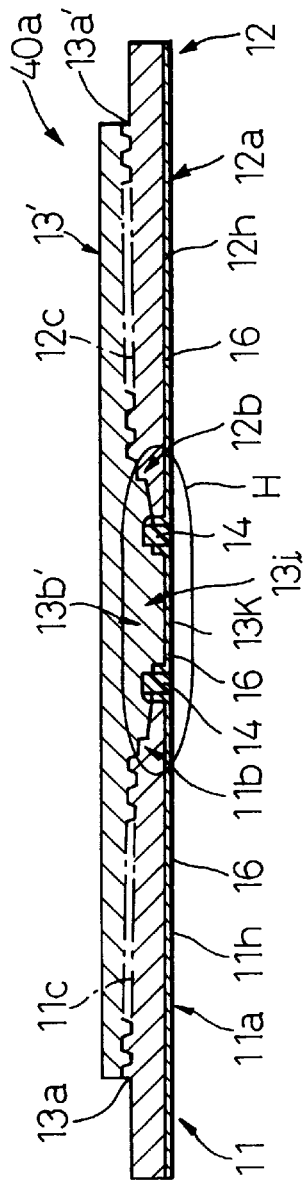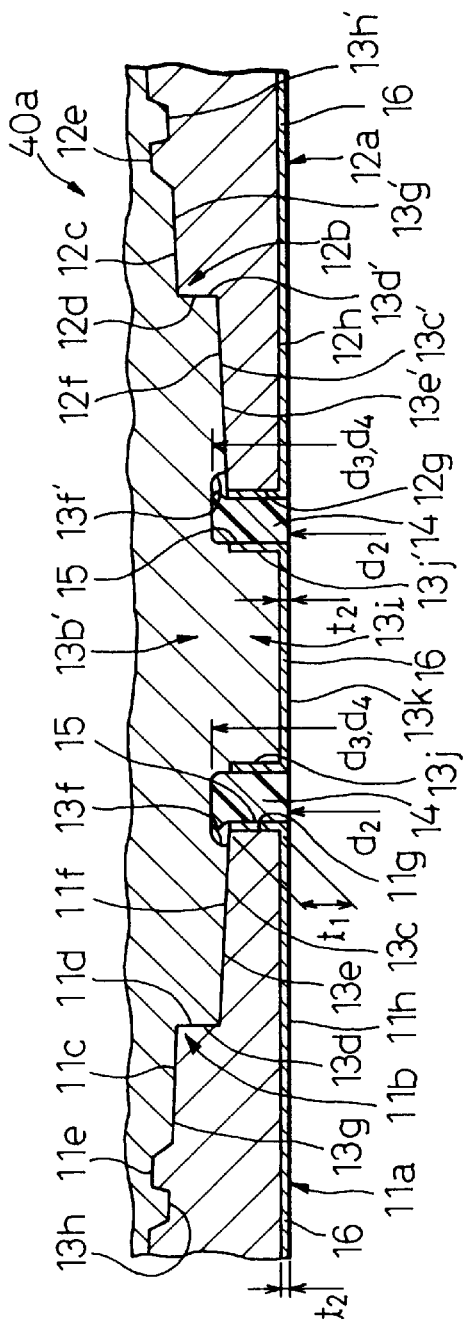

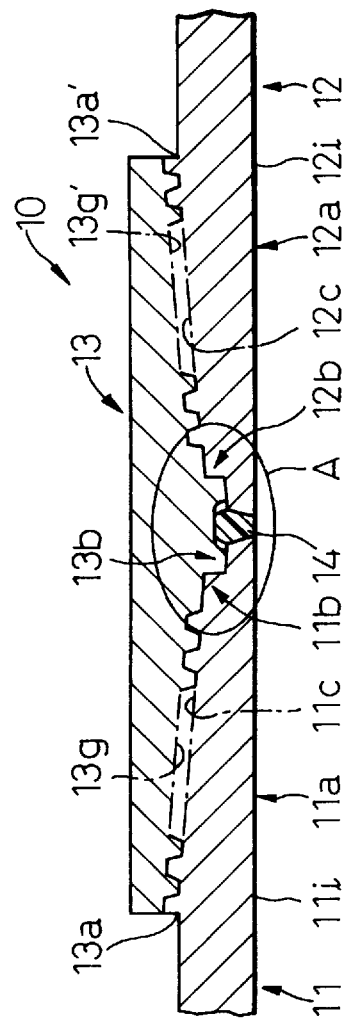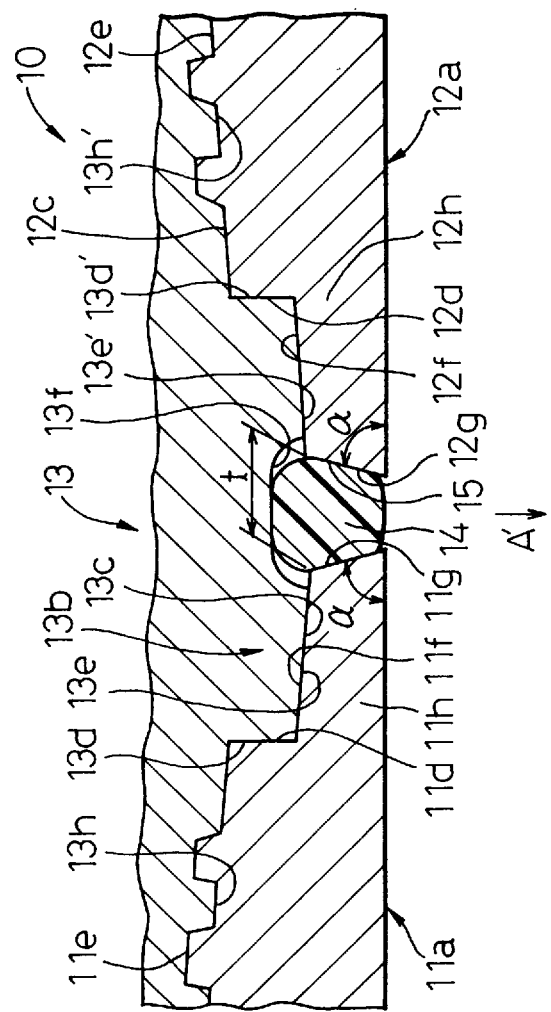

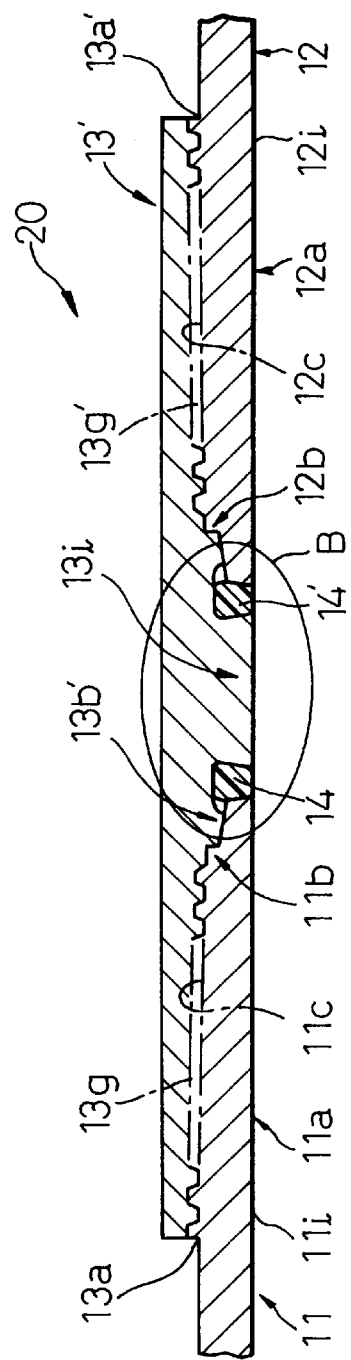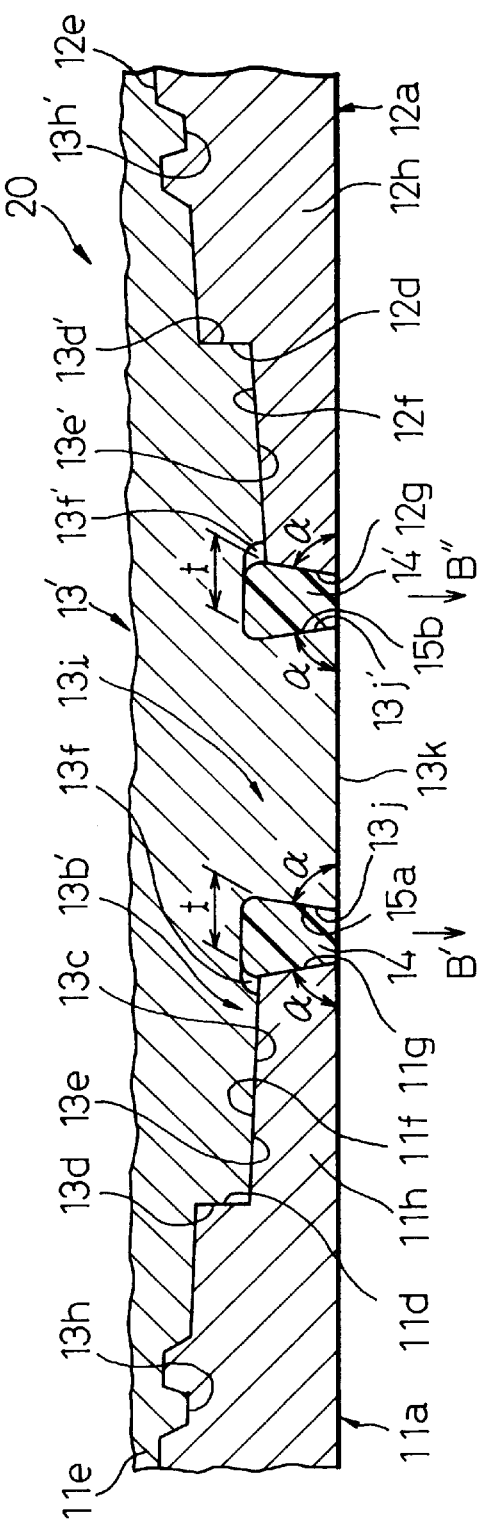
Fig.20(a)
Fig.20(b)

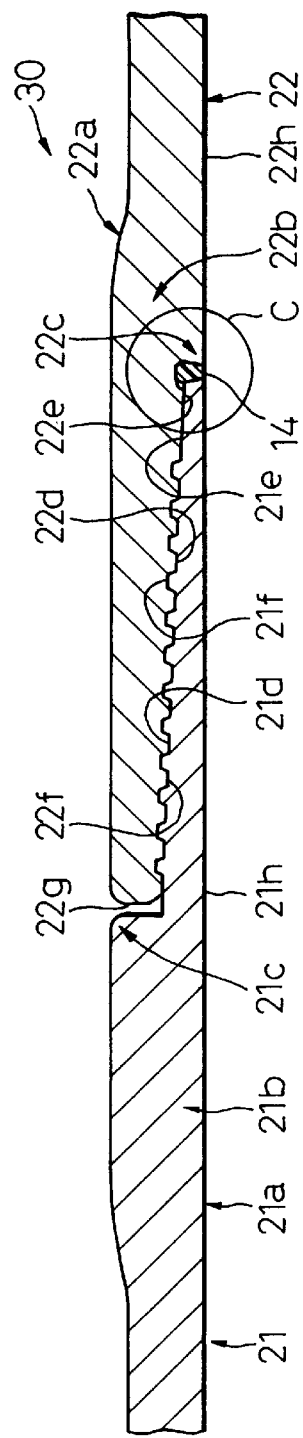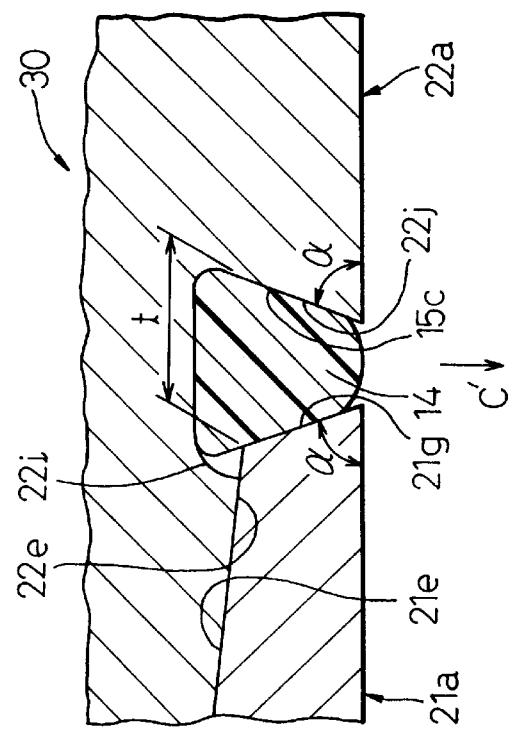

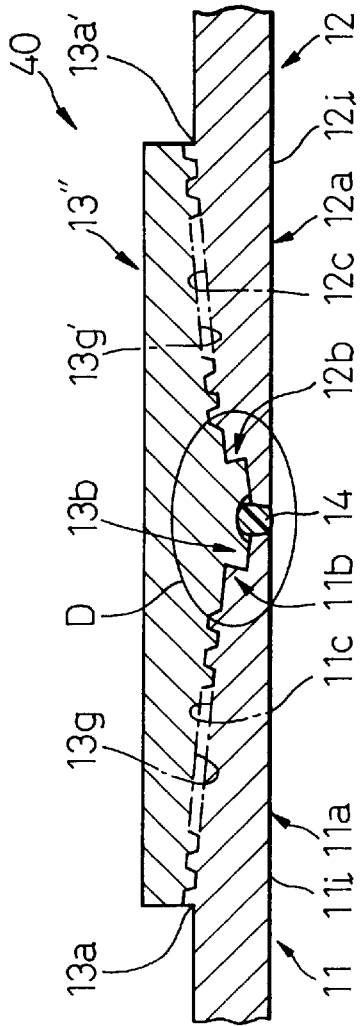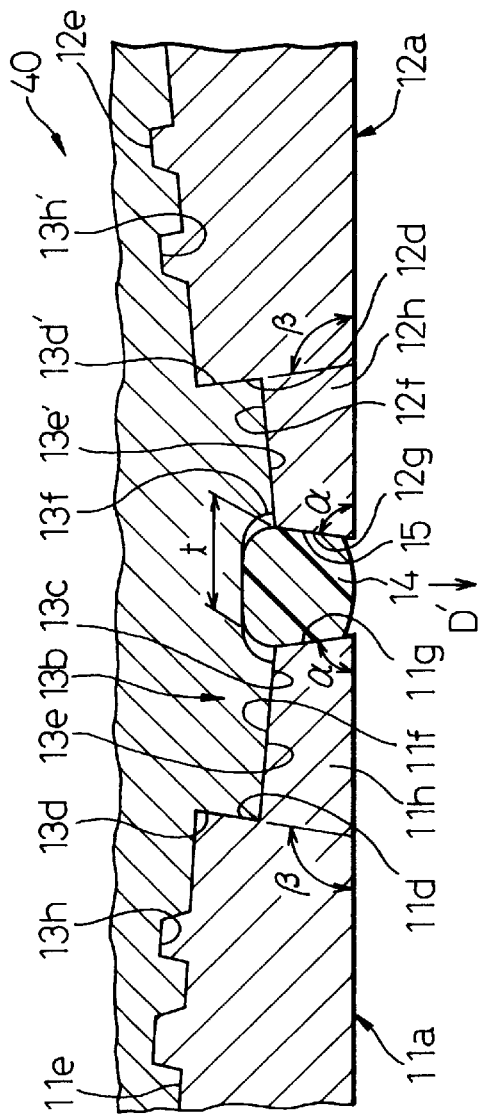

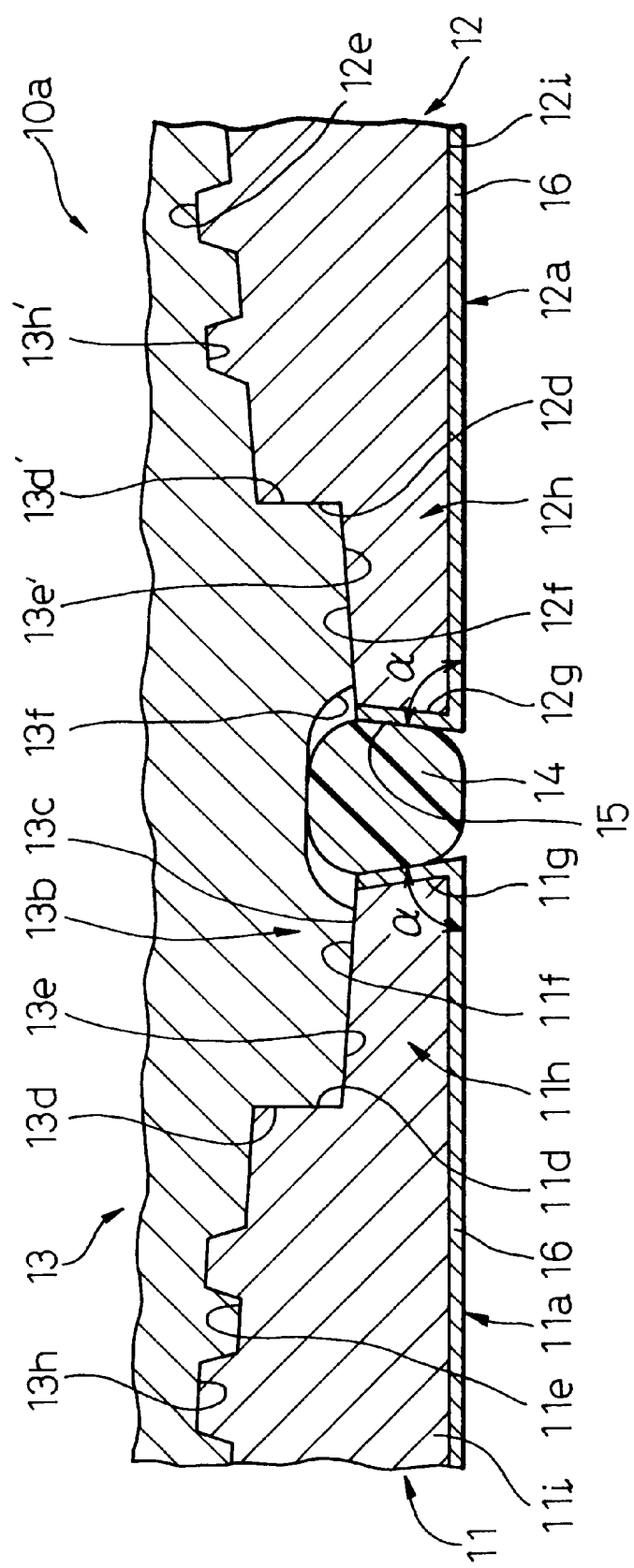

OIL WELL PIPE THREADED JOINT

BACKGROUND OF THE INVENTION

1. Field of the Invention

This invention relates to an oil well pipe threaded joint as a connection portion for tubes used for the excavation of a crude oil or a natural gas. More particularly, it relates to an oil well pipe threaded joint which can prevent the occurrence of looping or squeezing of a ring (also called a "ring-like buffer") interposed between pins of oil well pipes for improving the sealability of the oil well pipe threaded joint and damage such as corrosion due to a corrosive fluid inside a pipe.

2. Description of the Prior Art

To excavate crude oil or natural gas, it has been customary to drill an oil well (also called an "ore chute") from the ground surface to an oil layer or a gas layer, to apply a casing round the inner peripheral surface of this oil well so as to prevent the collapse of the oil well and to recover the crude oil or the natural gas through tubing inserted into the casing. Because the depth of the oil well is generally as great as several thousands of meters, steel pipes of a low alloy steel, etc, are fastened to one another by various methods to obtain an elongated pipe. Here, the connection portion of the tubing, etc, is referred to as an "oil well pipe threaded joint".

Various oil well pipe threaded joints are known as described below. ① Japanese Unexamined Utility Model Publication (Kokai) No. 58-142475 proposes an oil well pipe threaded joint wherein a pin having an outside thread is formed on an outer peripheral surface in the proximity of an end portion of each pipe and a coupling (also called a "sleeve") having an inside thread on an inner peripheral surface in the proximity of an open portion of a cylindrical member is formed so that the pin of each pipe can be threaded to this coupling. In this case, since the fitting and removal works are repeatedly carried out between each pipe and the coupling, a coating layer is likely to be damaged, and a ring made of a soft thermoplastic resin such as Teflon (trade name) is used. However, there remains the problem that the thermoplastic resin ring cannot play the role of a so-called "torque shoulder" for absorbing a torque acting on the distal end surface of each pipe and between both side surfaces of a protuberance portion at the time of makeup (also called "fastening") and for reliably securing fixing. ② Japanese Examined Utility Model Publication (Kokoku) No. 6-49989 proposes a threaded joint wherein a pin having an outside thread formed on the outer peripheral surface of one of the pipes in the proximity of the end portion thereof and a pin having an inside thread formed on the inner peripheral surface of the other pipe in the proximity of the end portion thereof are interengaged with each other.

Recently, a so-called "water injection well" which injects water or brine (hereinafter called "injection water") into the oil layer through the tubing has been widely employed in order to improve a crude oil recovery ratio. When ordinary water or brine is injected into the tubing, however, the tubing (or the oil well pipe) is remarkably corroded due to a high oxygen content of this injection water, and the collapse of the tubing occurs within a relatively short period. Therefore, to economically prevent the collapse of the tubing, ③ Japanese Unexamined Patent Publication (Kokai) No. 62-98088, Japanese Unexamined Utility Model Publication (Kokai) No. 4-63884, U.S. Pat. No. 5,236,230, etc, propose a so-called "inner surface coating tubing" which applies a corrosion-resistant material such as a synthetic resin or ceramic to the inner peripheral surface of the oil well pipe made of ordinary steel, etc, as a coating, and protects the tubing from a corrosive fluid inside the tubing such as crude oil.

Nonetheless, the conventional oil well pipe threaded joints described above are not free from detrimental deformation under the environment of use such as looping (also called "buckling" or "jump-out") and squeezing (also called "swell-out").

Here, the mechanism of looping is as follows. When the corrosive fluid (also called the "pressure medium") such as the crude oil or the natural gas inside the tubing enters the gap between a recess 55 defined by the distal end surface 51h, 52h of a pin 51a, 52a of each pipe 51, 52 and a groove 53f of a coupling 53 and a ring 54 fitted into this recess 55 and as a result, when the pressure of the pressure medium inside the tubing (also called the "pipe internal pressure) drops with respect to the pressure of the pressure medium (hereinafter called the "back pressure") as shown in FIG. 1(a), the back pressure is applied to the end surface of the ring 54 on the outside diameter side as indicated by and arrow in FIG. 1(a), so that the ring 54 is pressurized in a direction indicated by an arrow F' in FIG. 1(a) and partially jumps into the tubing as shown at the portion F in FIG. 1(b).

The mechanism of squeezing is as follows. During the makeup (or "fastening") work of the oil well pipe threaded joint, the distal end surfaces 51h and 52h of the pins 51a and 52a of the pipes 51 and 52 cause the ring 54 to interfere in the same direction as the axial direction of the tubing (hereinafter called the "axial direction"), or the groove 53f of the coupling 53 causes the ring 54 to interfere in the inner direction of the pipe as shown in FIG. 2. As a result, the ring 54 undergoes elastic deformation from the initial shape represented by dash line in FIG. 2 to the shape represented by solid line in FIG. 2 and swells out at the portion G in FIG. 2 in the direction represented by arrow G'.

Once such looping and squeezing occur, a tool lowered inside the tubing during a logging (or "drift") operation is caught by the ring which jumps out or swells out inside the tubing, and the logging operation cannot be carried out smoothly and the operation factor is remarkably lowered. When looping and squeezing occur in the oil well pipe threaded joint, the surface of the pin and the coupling which is originally covered with the ring is exposed, and this exposed surface comes into contact with the corrosive fluid and is eroded. As a result, the collapse of the tubing occurs within a short time, and reliability drastically drops.

To solve the problems described above, ④ a method which uses a so-called "retainer ring" by making a spring or a metallic ring composite with a synthetic resin has been proposed. ⑤ On the other hand, Japanese Unexamined Patent Publication (Kokai) No. 59-126191 proposes an oil well pipe joint having the construction wherein a lip portion having a tapered outer peripheral seal surface and a distal end seal surface is formed at an end portion of a pipe having an external thread, a shoulder portion having an inner peripheral seal surface and a butt seal surface corresponding to the outer peripheral seal surface and the distal end seal surface, respectively, is formed at the inner depth of a coupling having an internal thread engaging with the external thread, and stopper portions are formed in the proximity of the outer and inner peripheral seal surfaces in such a manner as to engage with each other.

⑥ Further, Japanese Examined Utility Model (Kokoku) No. 1-12051 proposes an oil well pipe threaded joint for engaging and connecting the pipe end portions with each other, which can butt the terminal portion of shoulder portion of the pipe end on the external thread side with that of the pipe end of the internal thread, and wherein a clearance is generated between the terminal portion of the shoulder portion of the pipe end on the internal thread side and that of the pipe end on the external thread side at the time of butting and moreover, the distal end outer surface portion at the pipe end on the external thread side and the depth inner surface of the pipe end of the internal thread side can be brought into pressure contact with each other. In this threaded joint for the oil well pipe, the threaded joint of the reference is characterized in that an inwardly inclined taper is formed on the shoulder portion at the pipe end on the internal thread side, an R-shaped recess is formed on the pipe end inner surface portion near this shoulder portion, and a packing material is interposed into the clearance between the shoulder portion and the terminal end portion of the pipe end on the external thread side so that both of them can be butted to each other.

According to the method of ④, however, the fitting work of the retainer ring is necessary. In addition, because the retainer ring has a metallic ring, it is difficult to cause deformation of the retainer ring, so that the fitting work is extremely difficult and the working factor is low. Moreover, since the retainer ring is expensive, the production cost becomes very high. In the oil well pipe joint of ⑤ Japanese Unexamined Patent Publication (Kokai) No. 59-126191, a corrosive fluid is likely to enter the so-called "metal seal" between the distal end seal surface of the lip portion of the pipe and the butt seal surface of the shoulder portion of the coupling because the ring is not used and as a result, the oil well pipe joint is easily corroded and the reliability is low. Further, because the distal end surface of the lip portion of the pipe is inclined at an obtuse angle with respect to the inner wall surface of the pipe, looping and squeezing described above cannot be prevented even when a ring is fitted between the distal end seal surface and the butt seal surface. Further, in the oil well pipe threaded joint of ⑥ Japanese Examined Utility Model Publication (Kokoku) No. 1-12051, only the shoulder portion at the pipe end on the internal thread side is inclined inward. Therefore, looping and squeezing of the ring cannot be sufficiently prevented.

SUMMARY OF THE INVENTION

The roles of the conventional well pipe joint with the built-in resin ring are to eliminate the gap occurring between the distal end of the pin and the coupling shoulder portion when the pipe inner surface or the coupling inner surface is coated by the resin coating, and to prevent damage of the coating due to the mutual direct contact of the resin coatings. However, none of the oil well joints according to the prior art have tackled looping as one of the buckling phenomena of the ring, and squeezing as static swellout of the ring to the inner pipe surface, have clarified this mechanism or have employed counter-measures. Therefore, the present invention is directed to prevent buckling and swellout of the ring in addition to the prevention of corrosion by eliminating the gap of the joint portion of the conventional joints and prevention of the damage of the coating at the distal end of the pin. In other words, in view of the problems described above, the present invention is directed to provide an oil well pipe threaded joint which can prevent looping and squeezing of a ring in the working environment or at the time of assembly, can therefore prevent catching of a tool at the time of logging, can also prevent damage such as corrosion by a corrosive fluid such as a crude oil, inside the pipe and which has a high working factor, a high reliability and corrosion resistance.

The gist of the present invention resides in the following points.

(1) An oil well pipe threaded joint of the type wherein a coupling having a smooth surface formed on a reduced diameter inner peripheral surface obtained by forming a shoulder portion on an inner peripheral side, on an inner peripheral surface thereof and an inside thread formed on each large diameter inner peripheral surface thereof, arid two pins each having an outside thread formed on a large diameter outer peripheral surface obtained by forming a shoulder portion on an outer peripheral side, on an outer peripheral surface thereof and a smooth surface formed on a reduced diameter outer peripheral surface thereof, are coupled by interposing a soft synthetic resin ring between the distal end surface of each of the pins and bringing each step surface of the shoulder portion on the inner peripheral side of the coupling into abutment with a step surface of each of the pins so as to engage the inside thread of the coupling and the outside thread of each of the pins, characterized in that a compressive ratio of the soft synthetic resin ring in an axial direction falls within the range expressed by the following inequality (1):

$$18{,}000/E \leq \text{compressive ratio } (\%) < 0.038^{-1} \times In[1-\{(d_1-d_2)+0.36\}/0.25t_1] \quad (1)$$

where E: elastic modulus MPa, $d_1$: inside diameter of pin mm, $d_2$: inside diameter of soft synthetic ring mm, $t_1$: thickness of distal end of pin mm.

(2) An oil well pipe threaded joint according to the item (1), wherein a protuberance portion is formed on the inner peripheral surface on the reduced diameter side of the shoulder portion on the inner peripheral side of the coupling, and the synthetic resin ring is interposed between each step of the protuberance and the distal end surface of the pins.

(3) An oil well pipe threaded joint according to the item (1) or (2), wherein a coating layer is disposed at least on the inner peripheral surface of each of the pins and on the reduced diameter inner peripheral surface of the protuberance portion of the coupling, and the compressive ratio of the soft synthetic resin ring in the axial direction falls within the range expressed by the following inequality (2):

$$18{,}000/E \leq \text{compressive ratio } (\%) < 0.038^{-1} \times In[1-\{(d_1-2t_2-d_2)+0.36\}/0.25t_1] \quad (2)$$

where E: elastic modulus MPa, $d_1$: inside diameter of pin $d_2$: inside diameter of soft synthetic ring mm, $t_1$: thickness of distal end of pin $t_2$: thickness of coating layer.

(4) An oil well pipe threaded joint according to the item (1) or (2), wherein a groove having a smaller diameter than the outside diameter of the soft synthetic ring is disposed on the reduced diameter inner peripheral surface of the coupling in order to insert the soft synthetic resin ring, and the compressive ratio of the soft synthetic resin ring in the axial direction falls within the range expressed by the following inequality (3):

$$18{,}000/E \leq \text{compressive ratio } (\%) < 0.038^{-1} \times In[1-\{(d_1-d_2)+0.36+(d_3-d_4)\}/0.25t_1] \quad (3)$$

where E: elastic modulus MPa, $d_1$: inside diameter of pin mm, $d_2$: inside diameter of soft synthetic ring mm, $d_3$: outside diameter of soft synthetic ring mm, $d_4$: inside diameter of groove mm $t_1$: thickness of distal end of pin mm.

(5) An oil well pipe threaded joint according to the item (1) or (2), wherein a coating layer is disposed at least on the inner peripheral surface of each of the pins and on the reduced diameter inner peripheral surface of the protuberance portion of the coupling, a groove having a smaller diameter than the outside diameter of the soft synthetic ring is disposed on the reduced diameter inner peripheral surface of the coupling in order to insert the soft synthetic resin ring, and the compressive ratio of the soft synthetic resin ring in the axial direction falls within the range expressed by the following inequality (4):

$$18{,}000/E \leq \text{compressive ratio } (\%) < 0.038^{-1} \times \ln[1 - \{(d_1 - 2t_2 - d_2) + 0.36 + (d_3 - d_4)\}/0.25 t_1] \quad (4)$$

where E: elastic modulus MPa, $d_1$: inside diameter of pin mm, $d_2$: inside diameter of soft synthetic resin ring mm, $d_3$: outside diameter of soft synthetic ring mm, $d_4$: inside diameter of groove mm $t_1$: thickness of distal end of pin mm.

$t_2$: thickness of coating layer mm.

(6) An oil well pipe threaded joint of the type wherein a coupling having a smooth surface formed on a reduced diameter inner peripheral surface obtained by forming a shoulder portion on an inner peripheral side, on an inner peripheral surface thereof and an inside thread formed on each large diameter inner peripheral surface thereof, and two pins each having an outside thread formed on a large diameter outer peripheral surface obtained by forming a shoulder portion on an outer peripheral side, on an outer peripheral surface thereof and a smooth surface formed on a reduced diameter outer peripheral surface thereof, are coupled by interposing a ring between the distal end surface of each of the pins and bringing each step surface of the shoulder portion on the inner peripheral side of the coupling into abutment with a step surface of each of the pins so as to engage the inside thread of the coupling and the outside thread of each of the pins, characterized in that the distal end surface of each of the pins is inclined at an acute angle to the inner peripheral surface of the pin.

(7) An oil well pipe threaded joint according to the item (6), wherein a protuberance portion is formed on the reduced diameter inner peripheral surface of the shoulder portion on the inner peripheral side of the coupling, the synthetic resin ring is interposed between each step of the protuberance portion and the distal end surface of each of the pins, and the step surface of the protuberance portion of the coupling is inclined at an acute angle to the inner peripheral surface of each of the pins.

(8) An oil well pipe threaded joint according to the item (6) or (7), wherein each step surface of the shoulder portion on the inner peripheral side of the coupling is inclined at an obtuse angle to the inner peripheral surface of each of the pins, and the distal end surface of each of the pins is inclined at an angle of inclination substantially equal to the angle of inclination of each step surface of the shoulder portion on the inner peripheral surface of the coupling.

(9) An oil well pipe threaded joint of the type wherein one of the pins having a smooth surface and an outside thread that are formed in sequence from a distal end surface side on a reduced diameter outer peripheral surface obtained by forming a shoulder portion on an outer peripheral side on an outer peripheral surface thereof and the other pin having an inside thread and a smooth surface that are formed in sequence from a distal end surface side on a large diameter inner peripheral surface obtained by forming a shoulder portion on an inner peripheral side on an inner peripheral surface thereof, are coupled by interposing a ring between the distal end surface of one of the pins and a step surface of the shoulder portion on the inner peripheral side of the other of the pins, and engaging the outside thread of one of the pins and the inside thread of the other of the pins, characterized in that the distal end surface of one of the pins and the step surface of the other of the pins are inclined at an acute angle to the inner peripheral surface of each of the pins.

(10) An oil well pipe threaded joint according to any of the items (1), (6) and (9), wherein the material of the ring is polytetrafluoroethylene containing 10 to 30 wt % of glass fiber, or a fluororesin.

(11) An oil well pipe threaded joint according to any of the items (6) through (9), wherein a coating layer is disposed at least one the inner peripheral surface of each of the pins and on the reduced diameter inner peripheral surface of the protuberance portion of the coupling.

(12) An oil well pipe threaded joint according to any of the items (3), (5) and (10), wherein the coating layer is made of a synthetic resin, a synthetic rubber or a fiber-reinforced plastic.

BRIEF DESCRIPTION OF THE DRAWINGS

FIG. 6(a) is a sectional view showing another example of the threaded joint according to the present invention, and FIG. 6(b) is an enlarged view of its principal portions.

FIG. 8(a) is a sectional view showing the principal portions of an oil well pipe threaded joint according to the first embodiment of the present invention.

FIG. 8(b) is an enlarged sectional view of the portion A shown in FIG. 8(a).

FIG. 11(*b*) is a graph showing the relation between compressive ratios of rings having different diameters and FEA of the contraction amounts of their inside diameters and their measured values.

FIG. 12(*a*) is a sectional view showing the principal portions of another oil well pipe threaded joint according to the first embodiment of the present invention.

FIG. 12(*b*) is an enlarged sectional view of the portion B shown in FIG. 12(*a*).

FIG. 13(*a*) is a sectional view showing the principal portions of an oil well pipe threaded joint according to the second embodiment of the present invention.

FIG. 13(*b*) is an enlarged sectional view of the portion C shown in FIG. 13(*a*).

FIG. 14(*a*) is a sectional view showing the principal portions of another oil well pipe threaded joint according to the second embodiment of the present invention.

FIG. 14(*b*) is an enlarged sectional view of the portion D shown in FIG. 14(*a*).

FIG. 15(*a*) is a sectional view showing the principal portions of an oil well pipe threaded joint according to the third embodiment of the present invention.

FIG. 15(*b*) is an enlarged sectional view of the portion E shown in FIG. 15(*a*).

FIG. 16(*a*) is a sectional view showing the principal portions of another oil well pipe threaded joint according to the third embodiment of the present invention.

FIG. 16(*b*) is an enlarged sectional view of the portion F shown in FIG. 16(*a*).

FIG. 17(*a*) is a sectional view showing the principal portions of an oil well pipe threaded joint according to the fourth embodiment of the present invention.

FIG. 17(*b*) is an enlarged sectional view of the portion G shown in FIG. 17(*a*).

FIG. 18(*a*) is a sectional view showing the principal portions of another oil well pipe threaded joint according to the fourth embodiment of the present invention.

FIG. 18(*b*) is an enlarged sectional view of the portion 11 shown in FIG. 18(*a*).

FIG. 19(*a*) is a sectional view showing the principal portions of an oil well pipe threaded joint according to the fifth embodiment of the present invention.

FIG. 19(*b*) is an enlarged sectional view of the portion A shown in FIG. 19(*a*).

FIG. 20(*a*) is a sectional view showing the principal portions of an oil well pipe threaded joint according to the sixth embodiment of the present invention.

FIG. 20(*b*) is an enlarged sectional view of the portion B shown in FIG. 20(*a*).

FIG. 21(*a*) is a sectional view showing the principal portions of another oil well pipe threaded joint according to the seventh embodiment of the present invention.

FIG. 21(*b*) is an enlarged sectional view of the portion C shown in FIG. 21(*a*).

FIG. 22(*a*) is a sectional view showing the principal portions of an oil well pipe threaded joint according to the eighth embodiment of the present invention.

FIG. 22(*b*) is an enlarged sectional view of the portion D shown in FIG. 22(*a*).

FIG. 23 is an enlarged sectional view showing the principal portions of an oil well pipe threaded joint according to the ninth embodiment of the present invention.

DESCRIPTION OF THE PREFERRED EMBODIMENTS

Hereinafter, fundamental technical features of the present invention will be explained.

Figure 3A:
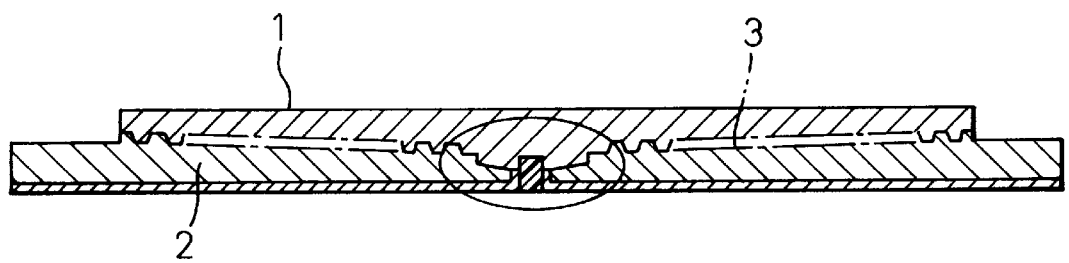
FIG. 3(a) is a schematic view showing an end face of a threaded joint portion according to the present invention.
Figure 3B:
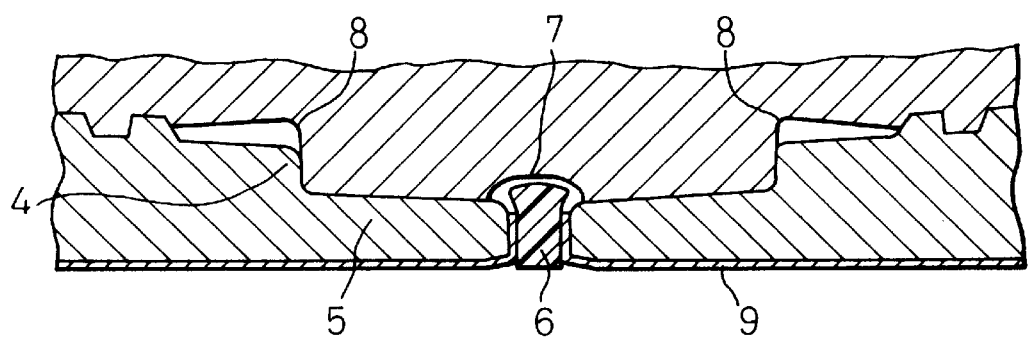
FIG. 3(b) is an enlarged view of the principal portions of the threaded joint portion.

FIGS. 3(*a*) and 3(*b*) show a threaded joint according to the present invention, and FIG. 3(*b*) is an enlarged view of the principal portions (portion of a circle) of FIG. 3(*a*). In these drawings, the threaded joint comprises a coupling 1 and a pin 2. The pin continues a thread portion 3 and has a shoulder portion 4 and a seal portion 5 continuing the shoulder portion 4. A ring 6 is disposed in such a manner as to be interposed between the distal ends of opposed rings 2. Here, a first groove (ring inserting groove 7) is formed in the coupling, and a second groove (stress relief groove 8) is formed immediately above the shoulder. Reference numeral 9 denotes a coating that protects a base material.

Here, each of the shoulder portion 4 and the seal portion 5 has an optimum structure such that, because an excessive torque and compressive load under an overload torque condition or a compressive load condition are absorbed by the shoulder portion, adverse influences are not exerted on the seal portion, and the compressive ratio of the ring can be correctly controlled by controlling appropriately the tolerance between the shoulders on both sides and the tolerance in an axial direction of the pin seal portion.

Figure 4A:
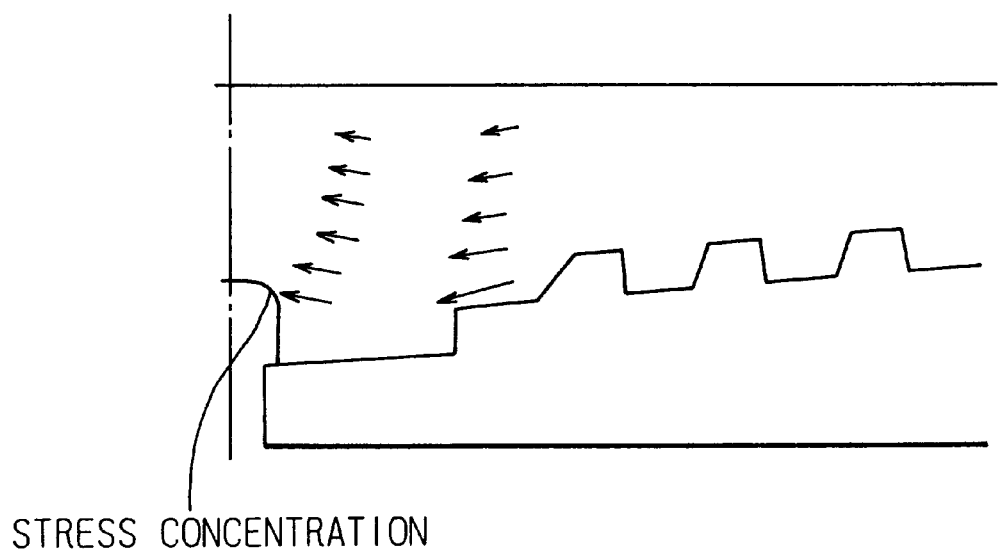
FIG. 4(a) is a diagram showing the flow of a stress in an axial direction of the joint portion when a stress relief groove does not exist.
Figure 4B:
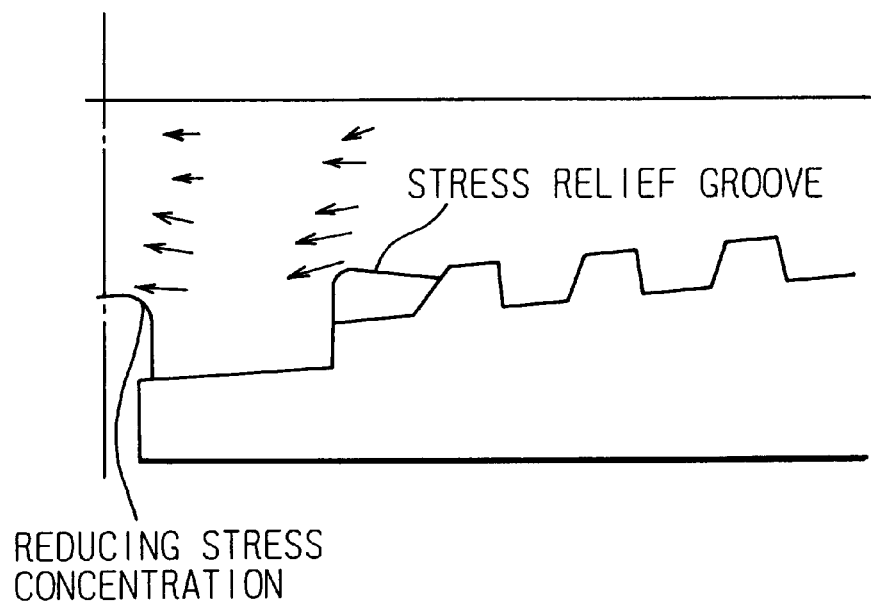
FIG. 4(b) shows the case where it exists.

The mechanism capable of relieving the stress of the groove 7 for inserting the ring by the groove 8 will be explained. FIG. 4(*a*) schematically shows the flow of the stress in the axial direction when the stress relief groove does not exist. The stress transmitted by the thread portion is diffused simultaneously when the sectional area of the coupling becomes great at the coupling portion immediately above the seal portion, then strikes the ring inserting groove and invites stress concentration at the ring bottom portion. When this stress exceeds a critical value for SSC of the material, there occurs the possibility that sulfide stress corrosion crack develops with the groove bottom being the start point.

In contrast, when the stress relief groove 8 exists as shown in FIG. 4(*b*), the flow of the stress cannot easily reach the groove 7 and as a result, the stress concentration on the groove 7 can be mitigated.

Figure 5A:
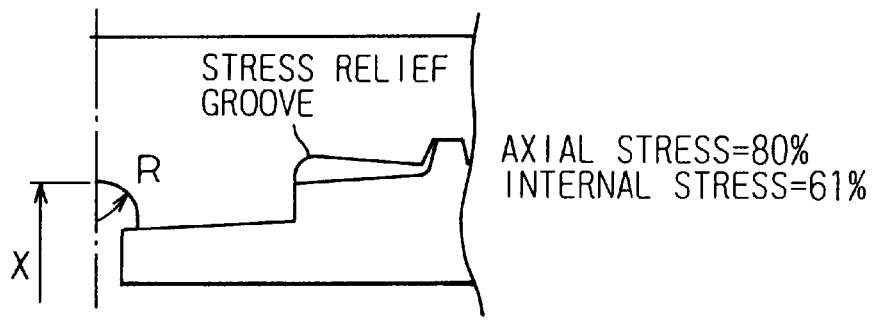
FIG. 5(a) is a schematic view showing the stress concentration of the groove executed by a finite element method and also showing a joint structure thereof.
Figure 5B:
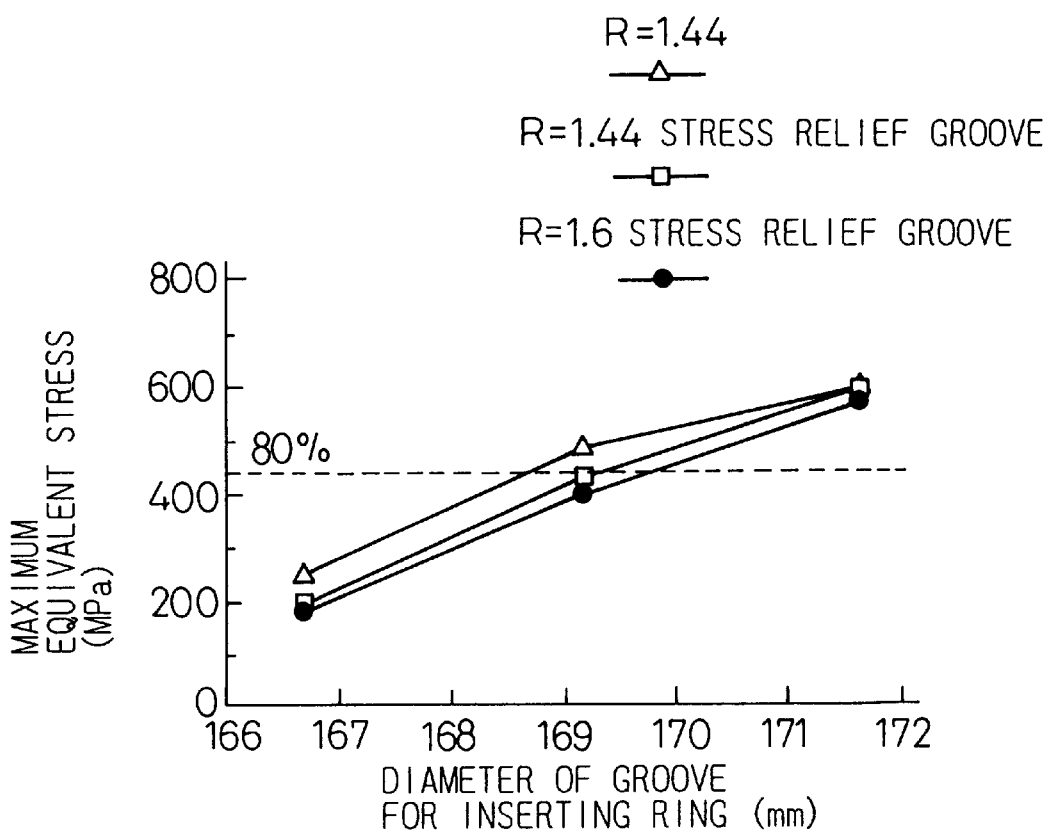
FIG. 5(b) is a diagram showing the relation between a groove diameter and a maximum equivalent stress.

Such an effect is quantitatively expressed by a finite element method and is graphically shown in FIGS. 5(*a*) and 5(*b*). It can be seen that the stress of the ring inserting groove significantly drops by disposing the stress relief groove 8. Though the stress concentrates on the bottom of the stress relief groove, the groove surface is not directly exposed to the corrosive fluid and there occurs no practical problem.

The depth of the stress relief groove 8 and the depth of the ring inserting groove 7 are preferably smaller than the depth of the root of the first screw of the coupling 1. This is in order to keep the joint strength of the coupling at an equivalent level to the original coupling strength which does not have the groove. According to this design, the joint strength can be maintained without reducing the critical section of the coupling.

Figure 1A:
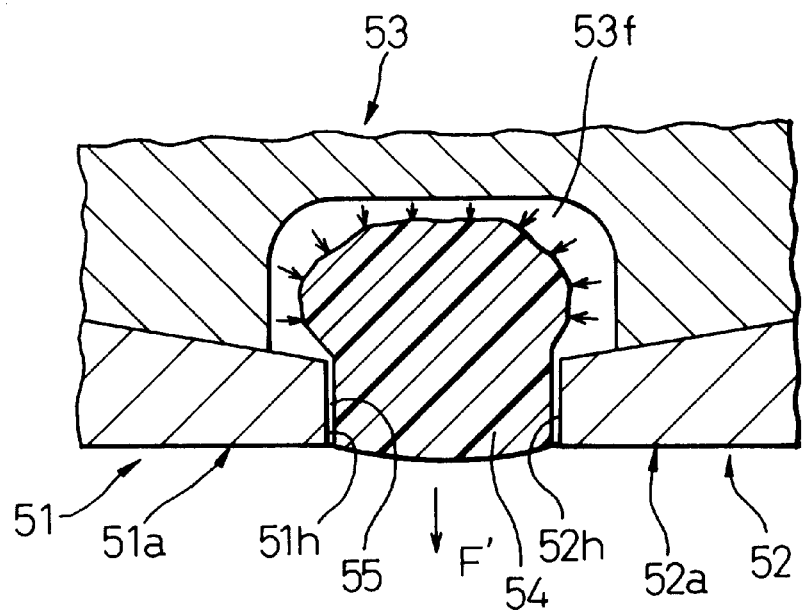
FIG. 1(a) is an enlarged sectional view showing the principal portions of looping of a ring.
Figure 1B:
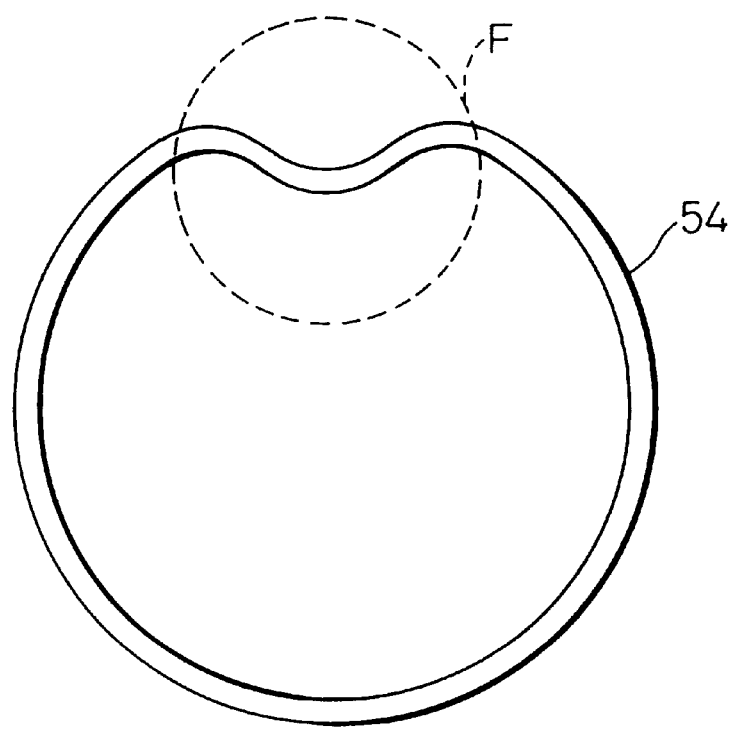
FIG. 1(b) is a planar schematic view showing looping of the ring.
Figure 2:
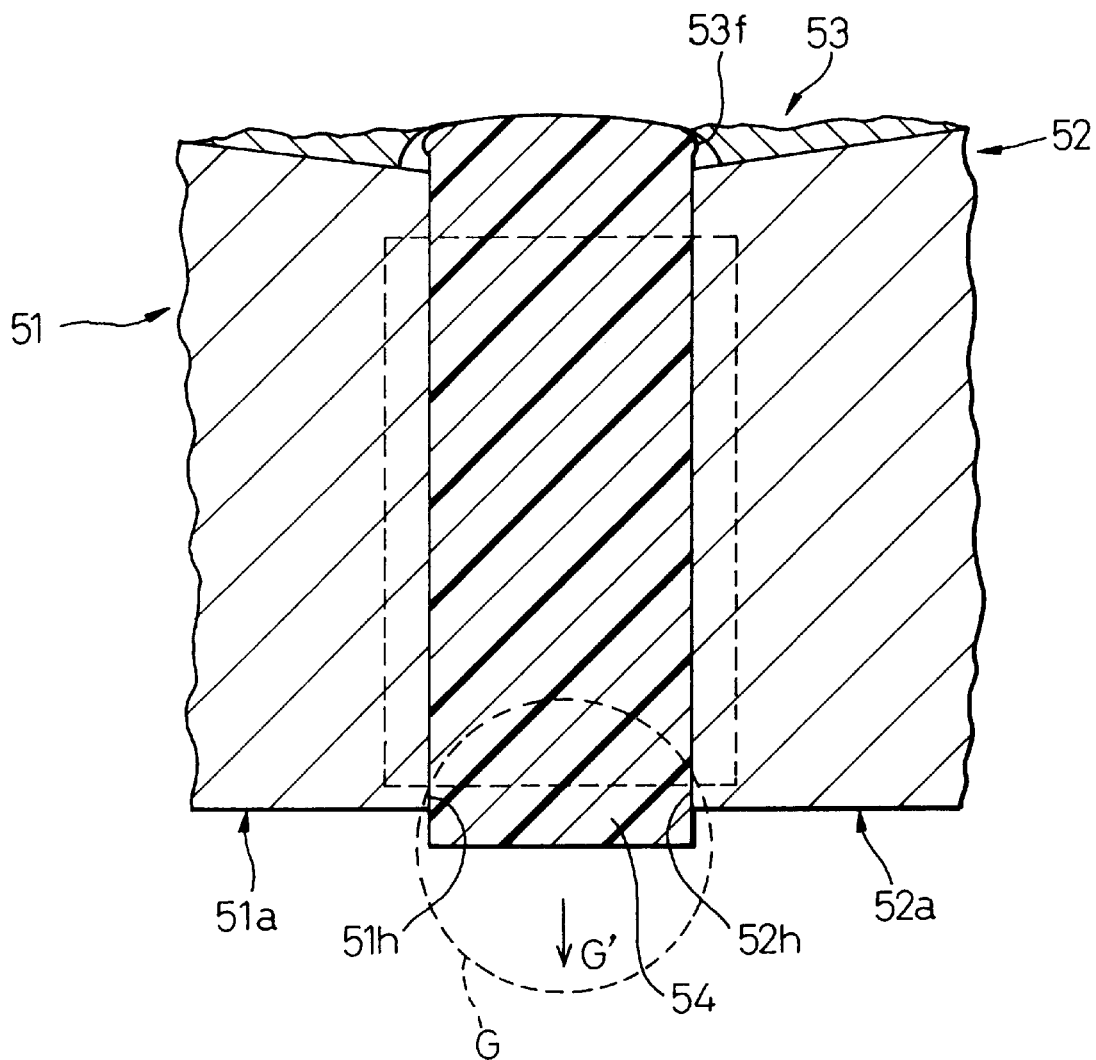
FIG. 2 is a schematic sectional view showing squeezing of the ring.

FIGS. 2(a) and 2(b) represent the example where coating is applied to the pin inside surface and to its distal end portion among the threaded joints according to the present invention. Generally, such joints are used in most cases in combination with a pipe having a coated inside surface. Because both the pipe base material and the joint portion are not brought into direct contact with the fluid on their inside surfaces, the corrosion resistance of the pipe body and the joint portion can be improved when the fluid is a corrosive fluid. Since the coupling portion does not come into direct contact with the inside fluid, such a coating need not be applied to the coupling portion, and this is advantageous, too, from the aspect of the cost. FIGS. 6(a) and 6(b) show the example where the rings 6 and 6 are interposed between the pipe distal end and the coupling, and they have the stress relief groove.

Figure 7:
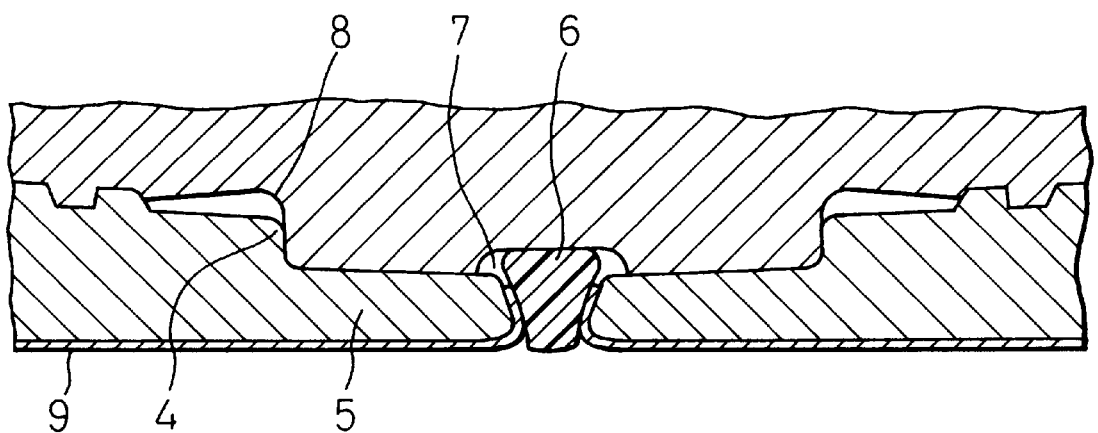
FIG. 7 is a schematic view showing the principal portions of the threaded joint having another structure according to the present invention.

When the ring material is remarkably softer than the steel such as an elastic material, it does not have the torque control function, and the stress relief means becomes necessary for the torque stopper and the ring inserting groove as described above. FIG. 7 shows an example of technology for embodying such a means.

Hereinafter, the reason for the stipulation of the compressive ratio of the soft synthetic resin ring in the axial direction in the scope of claims 1 to 5 as the first technical feature of the present invention will be explained.

① First, the oil well pipe threaded joint according to the first embodiment of the present invention is constituted by using a pipe having an outside diameter of 7 inches (177.8 mm) and a thickness of 0.4 inch (10.36 mm), a coupling for the pipe having an outside diameter of 7 inches and a soft synthetic resin ring for the pipe having an outside diameter of 7 inches, as shown in FIGS. 8(a) and 8(b). By the way, a seal ring material stipulated by the American Petroleum Institute (API) (a composite material prepared by adding 25 wt % of glass fiber to PTFE) is used. Next, a nitrogen gas is allowed to flow as a pressure medium in the oil well pipe threaded joint at a temperature of 120° C. The pressure of this pressure medium inside the pipe is lowered at a rate of 7 MPa/min, and the surface stress behaviour of the soft synthetic resin ring at the time of reduction of the pipe inside pressure is analyzed by a finite element analysis method (which is also referred to as the "FEA").

Figure 9:
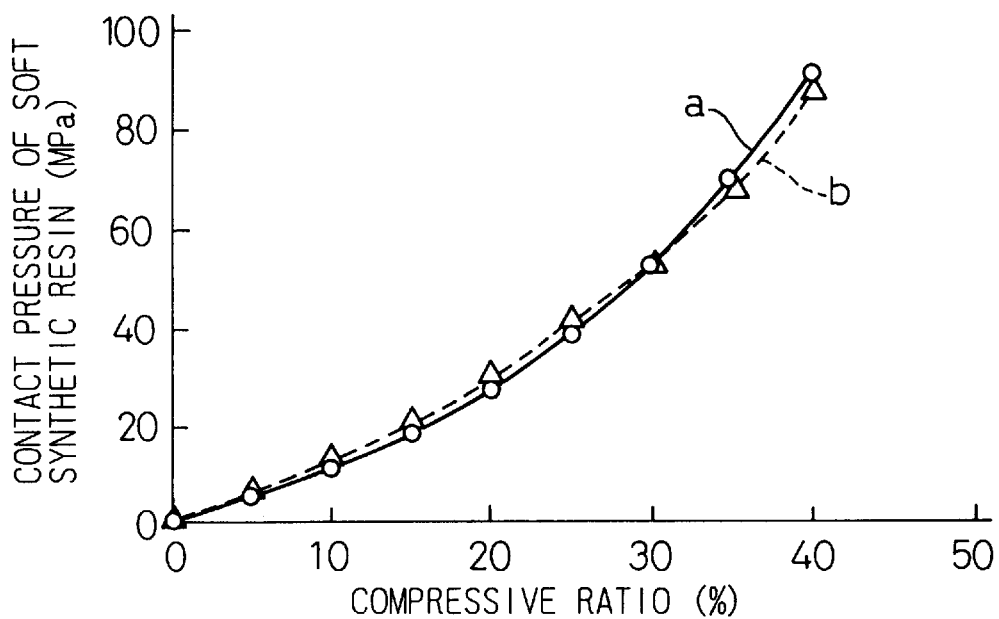
FIG. 9 is a graph showing the relation between a compressive ratio of a soft synthetic resin ring and a contact pressure.

In order to confirm the influences of the size of the soft synthetic resin ring on looping and squeezing of the soft synthetic resin ring, ② the same experiment as described above is carried out by using a pipe having an outside diameter of 5.5 inches (139.7 mm) and a thickness of 0.24 inch (6.07 mm), a coupling for a pipe having an outside diameter of 5.5 inches and a soft synthetic resin ring for a pipe having an outside diameter of 5.5 inches. The result is shown in FIG. 9. By the way, the abscissa in the drawing represents the compressive ratio of the soft synthetic resin ring and the ordinate represents the contact pressure of the soft synthetic resin ring. Solid line a represents the relation between the contact pressure and the compressive ratio of the soft synthetic resin ring of the oil well pipe threaded joint of ①, and dash line b represents the relation between the contact pressure and the compressive ratio of the soft synthetic resin ring of the oil well pipe threaded joint of ②. The value of the pressure reduction rate 7 MPa/min is the maximum pressure reduction rate at the time of the pipe inside pressure change occurring in ordinary oil well digging.

The compressive ratio of the soft synthetic resin ring in the axial direction plotted on the abscissa in the diagram is determined in accordance with the following equation (5):

$$\text{compressive ratio } (\%) = (b_0 - b_1)/b_0 \quad (5)$$

where:
$b_0$: width of soft synthetic resin ring before fastening
$b_1$: width of soft synthetic resin ring after fastening.

It has been confirmed that the contact pressure behaviour of the soft synthetic resin ring for a pipe having an outside diameter of 7 inches is substantially equivalent to that of the soft synthetic resin ring for a pipe having an outside diameter of 5.5 inches, as can be clearly seen from FIG. 9. As a result, looping and squeezing of the soft synthetic resin ring does not depend on the diameter of the soft synthetic resin ring but is solely governed by the compressive ratio of the soft synthetic resin ring in the axial direction.

Figure 10:
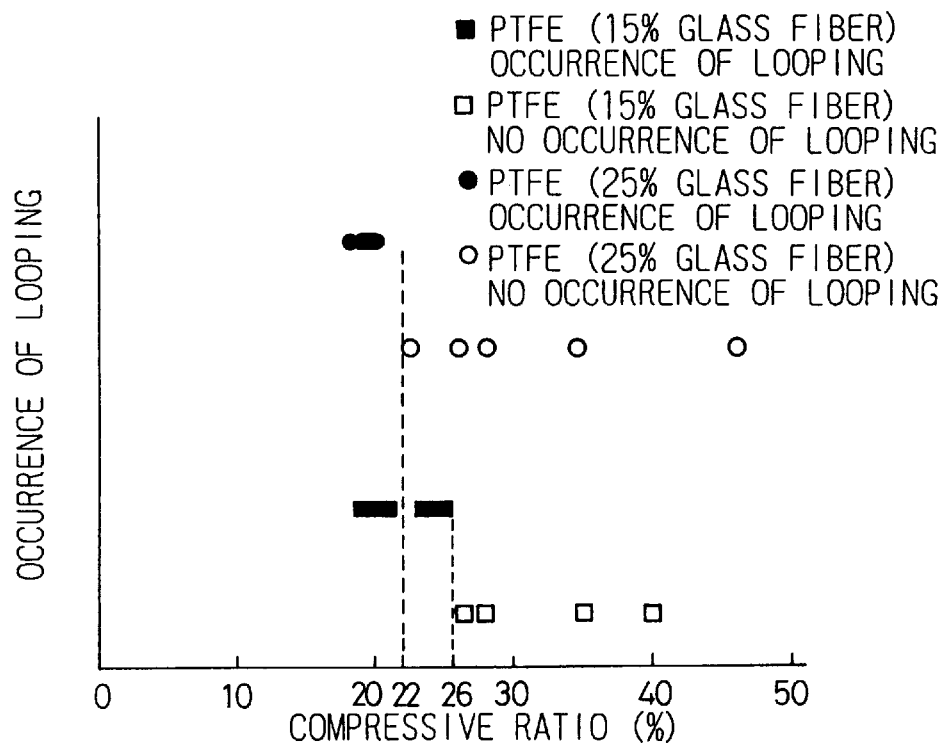
FIG. 10 is a graph showing the compressive ratio of the soft synthetic resin ring and the occurrence state of looping.

Next, the existence of looping of the soft synthetic resin ring (PTFE incorporating 15% and 25% of glass fiber) at the time of the reduction of the pipe inside pressure in the oil well pipe threaded joint is confirmed by eye and by touch. The experiment is carried out in the same way as described above with the exception that the pressure reduction rate is elevated from 7 MPa/min to 14 MPa/min. The result is shown in FIG. 10. In the diagram, solid marks represent looping of the rings, blank marks represent those which do not cause looping and dash line represents the looping limit.

It can be clearly seen from FIG. 10 that when the compressive ratio of the soft synthetic resin ring of PTFE containing 1.5% glass fiber in the axial direction is greater than 26%, the restriction force for preventing jump-out of the soft synthetic resin ring becomes stronger, so that the soft synthetic resin ring hardly jumps out and looping can be prevented. By the way, when the pressure reduction rate is elevated from 7 MPa/min to 14 MPa/min, too, the same result as described above can be obtained. It has been therefore found out that looping of the soft synthetic resin ring can be prevented by setting its compressive ratio in the axial direction to at least 22% without depending on the pressure reduction rate of the soft synthetic resin ring with respect to looping. Incidentally, this looping changes in accordance with the elastic modulus of the soft synthetic resin ring, and a value 18,000/E (E: elastic modulus) may be used as the limit at which looping does not occur. The elastic modulus is 410 MPa for PTFE not containing a filler, 680 MPa for PTFE containing 15% of a glass fiber and 810 MPa for PTFE containing 25% of a glass fiber, for example.

Figure 11A:
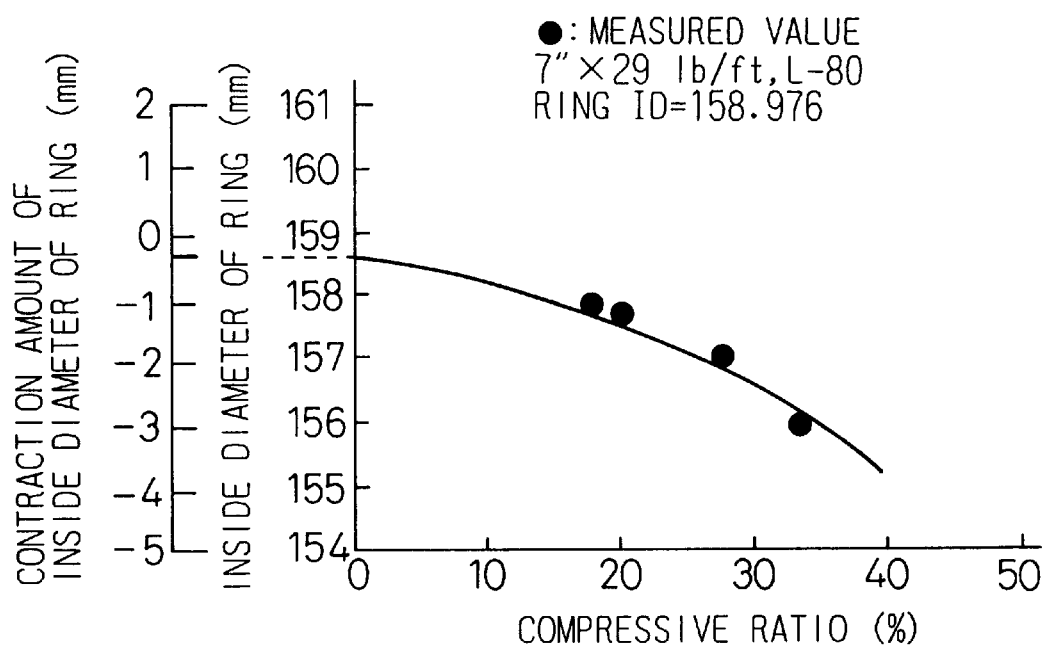
FIG. 11(*a*) is a graph showing the relation between a compressive ratio of a soft synthetic resin ring and the calculated value and measured value of the contraction amount of an inside diameter of the ring.

Next, the analysis is conducted by using the finite element analysis method (FEA) in order to predict the deformation behaviour of the resin type ring. A large deformation elastoplastic analysis is conducted for the steel portion, while an elastoplastic analysis is conducted for the resin type ring in accordance with Mooney-Rivilin's law. FIG. 11(a) comparatively shows the result of the finite element analysis and the experimental result of the practical deformation behaviour. Solid line represents the FEA analysis result and black circles represent the experimental results. As shown in the drawing, the condition is 7"×29 lb/ft, L-80, and the thickness of the pin distal end of 3.8 mm. This diagram represents that the result of the FEA analysis is in good agreement with the experimental results, and the practical deformation behaviour can be predicted by the FEA analysis.

Figure 11B:
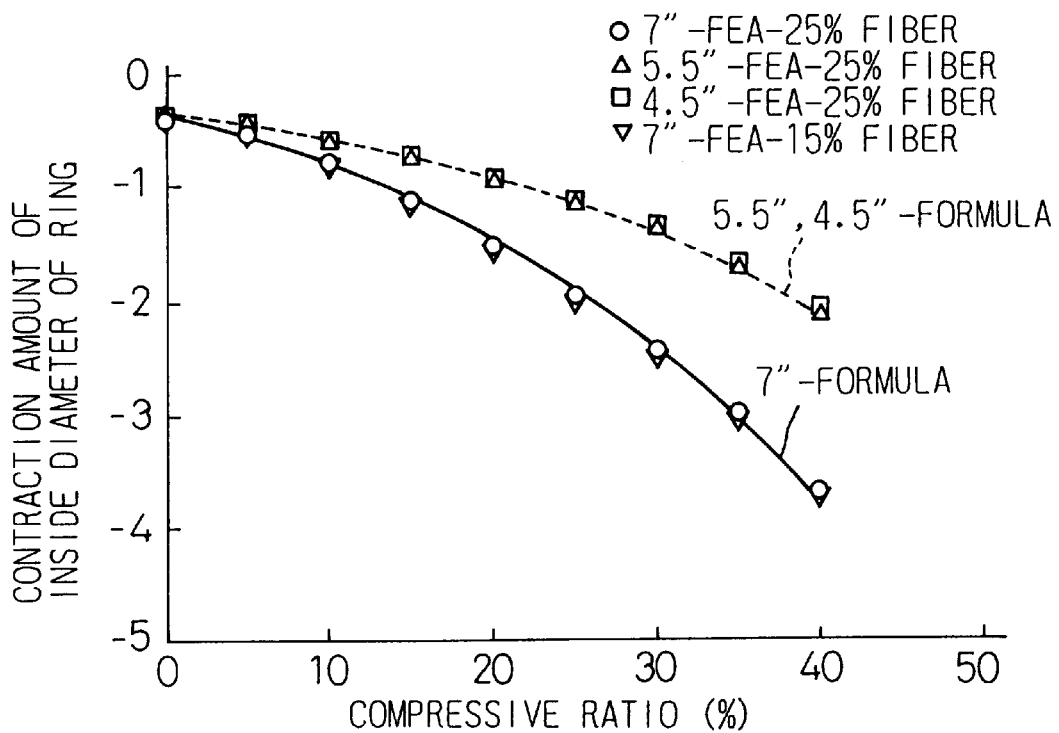

Further, FIG. 11(b) shows the results of the FEA analysis conducted under the following three conditions. The outside diameters of the pipes are three kinds, that is, 7", 5.5" and 4.5", and the thickness of the pin distal end is 3.8 mm, 2.0 mm and 2.0 mm, respectively, and as the ring material, PTFE containing 15% and 25% filler is used, respectively. It has been found out from this diagram that the contraction amount of the ring inside diameter ① does not depend on the outside diameter of the pipe, ② is proportional to the thickness of the pin distal end, and ③ has an exponential relation with the ring compressive ratio.

As a formula representing this FEA analysis result, the contraction amount (y) of the inside diameter ($d_2$) of the soft synthetic resin ring can be expressed by the following formula (6):

$$y = 0.25 t_1 (1 - e^{0.038x}) - 0.36 < 0 \quad (6)$$

where $t_1$: thickness of pin distal end x: compressive ratio of soft synthetic resin ring in axial direction.

In FIG. 11(b), the calculation results on the basis of the formula (6) are represented by a dotted line and a solid line, and these lines are in good agreement with the result of the FEA analysis.

It has been found out that the contraction amount (y) of the inside diameter of the soft synthetic resin ring does not depend on the outside diameter of the oil well pipe but is solely governed by the thickness ($t_1$) of the distal end of each pin and the compressive ratio (x) of the soft synthetic resin ring, as can be clearly seen from the formula (5). Therefore, it can be easily estimated that in order to prevent the soft synthetic resin ring from jumping to the inner peripheral surface of each pin at the time of makeup, the contraction amount (y) of the inside diameter of the soft synthetic resin ring needs be smaller than the difference between the inside diameter ($d_2$) of the soft synthetic resin ring and the inside diameter ($d_1$) of each pin.

Therefore, the following formula (7) can be deduced:

$$y = d_1 - d_2 < 0 \quad (7)$$

where $d_1$: inside diameter of pin, $d_2$: inside diameter of soft synthetic resin ring.

The upper limit value can be obtained by determining the compressive ratio (x) from the following formula (8) obtained by substituting the formula (7) for the formula (6):

$$y = d_1 - d_2 = 0.25 t_1 (1 - e^{0.038x}) - 0.36 < 0 \quad (8)$$

where $d_1$: inside diameter of pin, $d_2$: inside diameter of soft synthetic resin ring, $t_1$: thickness of pin distal end, x: compressive ratio of soft synthetic resin ring.

Looping can be prevented by setting the compressive ratio of the soft synthetic resin ring 14 in the axial direction to at least 18,000/E %, but according to the experiments conducted by the inventors of the present invention, it has been difficult to improve sealability because the contact pressure cannot be improved even by increasing this compressive ratio above 50%. As means for controlling the compressive ratio of the ring in the compressive ratio, the groove width for inserting the ring defined between the distal ends of the pins or between the pin distal end and the coupling by bringing the shoulder portion on the internal thread inner peripheral side and the shoulder portion on the external thread outer peripheral side into abutment with each other during makeup of the joint, and a ring compressive ratio as designed can be obtained. More practically, abutment of the shoulder portions can be judged by observing the drastic increase of the torque during makeup, and the overload torque after this abutment is absorbed by the shoulder portions and hardly affects the ring compressive ratio. In other words, the compressive ratio can be obtained as a design value which is independent of the makeup torque.

Another oil well pipe threaded joint according to the first embodiment of the present invention will be explained. As shown in FIGS. 12(a) and 12(b), a protuberance portion 13i having a substantially rectangular section is formed in such a manner as to extend from the shoulder portion 13b on the inner peripheral side of the coupling 13' towards the inner direction, and each soft synthetic resin ring 14 is interposed between the distal end face 11g, 12g of each pin 11a, 12a and each side surface of the protuberance portion (hereinafter called the "step surface") 13j, 13j' for engagement.

Next, the oil well pipe threaded joint according to the second embodiment of the present invention will be explained. As shown in FIGS. 13(a) and 13(b), a coating layer 16 of a synthetic resin or a fiber-reinforced plastic having high oil resistance or corrosion resistance is applied to the inner peripheral surface 11h, 12h of each pin 11a, 12a and to the distal end surface 11g, 12g as different points from the first embodiment.

Next, the reason why the compressive ratio of the soft synthetic resin ring 14 in the axial direction in the oil welt pipe threaded joint 20 according to the second embodiment of the present invention is limited to the range described in the afore-mentioned formula (2) will be explained.

To prevent the soft synthetic resin ring from jumping out to the inner peripheral surface of each pin during makeup, the inside diameter ($d_2$) of the soft synthetic resin ring may be set to be not less than the inside diameter ($d_1$) of each pin in the same way as described already. In this case, however, because the coating layer is applied to the inner peripheral surface of each pin, the thickness ($t_2$) of this coating layer must be taken into consideration.

As a result, the following formula (9) can be obtained from the afore-mentioned formula (7). Namely, $$y = d_1 - 2 t_2 - d_2 < 0 \quad (9)$$

where $d_1$: inside diameter of pin, $d_2$: inside diameter of soft synthetic resin ring, $t_2$: thickness of coating layer.

The upper limit value is obtained by determining the compressive ratio (x) for the following formula (10) obtained by substituting the formula (9) for the formula (6):

$$y = d_1 - 2 t_2 - d_2 = 0.25 t_1 (1 - e^{0.038x}) - 0.36 < 0 \quad (10)$$

where $d_1$: inside diameter of pin, $d_1$: inside diameter of soft synthetic resin ring, $t_1$: thickness of distal end of pin, $t_2$: thickness of coating layer, x: compressive ratio of soft synthetic resin ring in axial direction.

Another oil well pipe threaded joint according to the second embodiment of the present invention will be explained. As shown in FIGS. 14(a) and 14(b), a coating layer 16 of a synthetic resin or a fiber-reinforced plastic having high oil resistance or corrosion resistance is applied to the inner peripheral surface 11h, 12h and the distal end face 11g, 12g of each pin 11a, 12a, to the step surface 13j, 13j' of each protuberance 13i of the coupling 13' and to the inner peripheral surface 13k on the reduced diameter side as different points from the afore-mentioned embodiment.

Next, the oil well pipe threaded joint according to the third embodiment of the present invention will be explained.

As shown in FIGS. 15(*a*) and 15(*b*), a groove 13*f* having a smaller diameter than the outside diameter of the soft synthetic resin ring 14 is formed on the reduced diameter inner peripheral surface 13*c* of the shoulder portion 13*b* of the coupling 13 on the inner peripheral side as characteristic points.

The reason why the compressive ratio of the soft synthetic resin ring 14 of the oil well pipe threaded joint in the axial direction according to the third embodiment of the present invention is limited to the range of the afore-mentioned formula (3) will be explained.

First, the existence of looping of the soft synthetic resin ring at the time of the reduction of the inner pressure of the oil well pipe threaded joint is confirmed in the same way as in the first and second embodiments, and the relation between the contraction amount of the inside diameter and the compressive ratio is examined for each of a soft synthetic resin ring having an outside diameter of 7 inches and a soft synthetic resin ring having an outside diameter of 5.5 inches.

As a result, the same result as that of FIG. 10 can be obtained, and it has been found out that looping of the soft synthetic resin ring can be prevented by setting the compressive ratio of the soft synthetic resin ring in the axial direction to at least 22%. It has been found out further that the contraction amount (y) of the inside diameter of the soft synthetic resin ring can be expressed by the formula (6) in the same way as in the first and second embodiments.

Here, in order to prevent the soft synthetic resin ring from jumping out to the inner peripheral surface of each pin at the time of makeup, the inside diameter ($d_2$) of the soft synthetic resin ring may be set to be larger than the inside diameter ($d_1$) of each pin. In this case, however, since the groove is formed on the reduced diameter inner peripheral surface of the coupling, the inside diameter ($d_4$) of this groove must be taken into consideration. By the way, this inside diameter ($d_4$) of the groove must be a little smaller than the outside diameter ($d_3$) of the soft synthetic resin ring so that when the soft synthetic resin ring is brought into close contact with the inner peripheral surface of the groove by causing the soft synthetic resin ring to undergo elastic deformation at the time of makeup of the oil well pipe threaded joint, the center of each pin is in agreement with the center of the soft synthetic resin ring so as to thereby prevent squeezing resulting from eccentricity of this soft synthetic resin ring.

As a result, the following formula (11) can be acquired:

$$y=d_1-d_2+(d_3-d_4)<0 \tag{11}$$

where $d_1$: inside diameter of pin, $d_2$: inside diameter of soft synthetic resin ring, $d_3$: outside diameter of soft synthetic resin ring, $d_4$: inside diameter of groove.

The upper limit value can be obtained by determining the compressive ratio (x) for the following formula (12) obtained by substituting the formula (11) for the formula (6):

$$y=d_1-d_2+d_3-d_4=0.25t_1(1-e^{0.038x})-0.36<0 \tag{12}$$

where $d_1$: inside diameter of pin, $d_2$: inside diameter of soft synthetic resin ring, $d_3$: outside diameter of soft synthetic resin ring, $d_4$: inside diameter of groove, $t_1$: thickness of distal end of pin, x: compressive ratio of soft synthetic resin ring in axial direction.

Next, another oil well pipe threaded joint according to the third embodiment of the present invention will be explained.

The difference of another oil well pipe threaded joint 30*a* according to the third embodiment from another oil well pipe threaded joint 10*a* according to the first embodiment resides in that a groove 13*f*, 13*f'* having a smaller diameter than the outside diameter of the soft synthetic resin ring 14 is formed at each proximal end portion of the shoulder portion 13*b'* of the coupling 13' on the inner peripheral side as shown in FIGS. 16(*a*) and 16(*b*). In this case, too, looping and squeezing can be prevented in the same way as described above by setting the compressive ratio of each soft synthetic resin ring 14 in the axial direction within the range of the afore-mentioned formula (3).

The oil well pipe threaded joint according to the fourth embodiment of the present invention will be explained. As shown in FIGS. 17(*a*) and 17(*b*), a coating layer 16 of a synthetic resin or fiber-reinforced plastic having high oil resistance or corrosion resistance is applied to the inner peripheral surface 11*h*, 12*h* of each pin 11*a*, 12*a* and to the distal end surface 11*g*, 12*g*, and a groove 13*f* having a smaller diameter than the outside diameter of the soft synthetic resin ring 14 is formed on the reduced diameter inner peripheral surface 13*c* of the shoulder portion 13*b* of the coupling 13 on the inner peripheral side.

Since the compressive ratio of the soft synthetic resin ring 14 in the axial direction is set within the range of the afore-mentioned formula (4) in the oil well pipe threaded joint 40 of this embodiment, looping as well as squeezing can be prevented.

Next, the reason why the compressive ratio of the soft synthetic resin ring of the oil well pipe threaded joint 40 according to the fourth embodiment in the axial direction is limited within the range of the afore-mentioned formula (4) will be explained.

First, the existence of looping of the soft synthetic resin ring at the time of reduction of the inner pressure inside the oil well pipe threaded Joint is confirmed in the same way as in the first to third embodiments of the invention, and the relation between the contraction amount and compressive ratio is examined for each of a soft synthetic resin ring having an outside diameter of 7 inches and a soft synthetic resin ring having an outside diameter of 5.5 inches.

As a result, the same result as that of FIG. 10 can be obtained, and it has been found out that looping of the soft synthetic resin ring can be prevented by setting the compressive ratio of the soft synthetic resin ring in the axial direction to at least 22%. It has been found out also that the contraction amount (y) of the inside diameter of the soft synthetic resin ring can be expressed by the afore-mentioned formula (6).

Here, in order to prevent the soft synthetic resin ring from jumping to the inner peripheral surface of each pin at the time of makeup, the inside diameter ($d_2$) of the soft synthetic resin ring may be set to be not less than the inside diameter ($d_1$) of each pin, and in this instance, the following formula (13) can be acquired by taking the thickness ($t_2$) of the coating layer and the inside diameter ($d_4$) of the groove into consideration:

$$y=d_1-2t_2-d_2+(d_3-d_4)<0 \tag{13}$$

where $d_1$: inside diameter of pin, $d_2$: inside diameter of soft synthetic resin ring, $d_3$: outside diameter of soft synthetic resin ring, $d_4$: inside diameter of groove, $t_2$: thickness of coating layer.

Here, the upper limit value can be obtained by determining the compressive ratio (x) for the following formula (14)

obtained by substituting the formula (13) for the aforementioned formula (6):

$$y=d_1-2t_2-d_2+d_3-d_4=0.25t_1(1-e^{0.038x})-0.36<0 \qquad (14)$$

where $d_1$: inside diameter of pin,
$d_2$: inside diameter of soft synthetic resin ring,
$d_3$: outside diameter of soft synthetic resin ring,
$d_4$: inside diameter of groove,
$t_1$: thickness of distal end of pin,
$t_2$: thickness of coating layer,
x: compressive ratio of soft synthetic resin ring in axial direction.

It has been found out as a result in FIGS. 17(a) and 17(b) that when the coating layer 16 is applied to the inner peripheral surface 11h, 12h of each pin 11a, 12a and the groove 13f for inserting the soft synthetic resin ring 14 is formed, both looping and squeezing can be prevented by setting the compressive ratio of the soft synthetic resin ring 14 in the axial direction within the range of the aforementioned formula (3).

Next, another oil well pipe threaded joint according to the fourth embodiment of the present invention will be explained. The differences of another oil well pipe threaded joint 40a of the fourth embodiment from another oil well pipe threaded joint 10a of the first embodiment reside, as shown in FIGS. 18(a) and 18(b), in that a coating layer 16 of a synthetic resin or fiber-reinforced plastic having high oil resistance or high corrosion resistance is applied to the inner peripheral surface 11h, 12h of each pin 11a, 12a, to the distal end surface 11g, 12g, to the step surface 13j, 13j' of the protuberance portion 13i of the coupling 13' and further to the reduced diameter side inner peripheral surface 13k, and that a groove 13f, 13f' having a smaller diameter than the outside diameter of the soft synthetic resin ring 14 is formed at each proximal end portion of the shoulder portion 13b' of the coupling 13'. In this case, too, looping and squeezing can be prevented in the same way as described above by setting the compressive ratio of the soft synthetic resin ring 14 in the axial direction within the range of the afore-mentioned formula (4).

The material of the soft synthetic resin ring is not particularly limited. It is hereby preferred to employ synthetic rubbers such as hard rubbers, e.g. neoprene rubber, butyl rubber, etc, thermosetting resins such as silicone resin, epoxy resin, polyester, etc, difluororesin, trifluororesin, tetrafluororesin such as polytetrafluororesin (PTFE), tetrafluoroethylene polymer (FEP), etc, synthetic resins of thermoplastic resins such as furan resin, polyamide resin, polyimide, polyvinyl chloride, polyethylene, etc, and fiber-reinforced plastics (FRP) incorporating 10 to 30 wt % of reinforcing member such as glass fibers or carbon fibers in the synthetic resins described above. Since these materials have high flexibility, they can improve sealability by causing the soft synthetic resin ring to undergo elastic deformation and bringing it into close contact with the distal end surface of each pin, etc, at the time of makeup, and have also excellent oil resistance and corrosion resistance to a corrosive fluid fluidizing inside the tubing. When the fiber-reinforced plastics are used, further, they can cause the soft synthetic resin ring to play also the role of the torque shoulder and can prevent deflection of the soft synthetic resin ring. Therefore, these materials can improve the fitting work factor when the soft synthetic resin ring is interposed between the distal end surfaces of the pins.

The width and the thickness of the soft synthetic resin ring are not particularly limited, either, and a preferred width (b) satisfies the relation 2 mm≦b≦10 mm, and a preferred thickness (t) determined as the difference between the outside diameter and the inside diameter satisfies the relation 3 mm≦t≦13 mm. If the width of the soft synthetic resin ring is less than 2 mm, production tolerance occurs in the coupling and the pins that constitute the oil well pipe threaded joint, and there is the possibility that the soft synthetic resin cannot be compressed between the distal end surfaces of each pin with the compressive ratio defined by the formulas (1) to (4). If the width of the soft synthetic resin ring exceeds 10 mm, the production cost tends to increase, and both of these cases are not desirable. If the thickness of the soft synthetic resin ring is less than 3 mm, rigidity becomes so low that the working factor tends to drop at the time of makeup, and if the thickness of the soft synthetic resin ring exceeds 13 mm, the production cost is likely to increase. Therefore, both of these cases are not desirable.

The material of the coating layer is not particularly limited, either, and preferred examples are ceramics, and the similar synthetic resins, synthetic rubbers and fiber-reinforced plastics to those described for the soft synthetic resin ring. For, these materials have excellent oil resistance and corrosion resistance. Among them, the synthetic resins, the synthetic rubbers and the fiber-reinforced plastics are particularly preferred because they are economical and their coating is easy for various pipes. The coating methods of the various coating layers include brushing and spraying of the synthetic resin softened to a liquid form when the synthetic resin is used for the coating layer, and bonding by using an adhesive such as cement when the fiber-reinforced plastics are used for the coating layer. By the way, the coating layer may be formed not only on the inner peripheral surface of the pipe but also to the distal end surface of each pin of the pipe, the step surface and the reduced diameter inner peripheral surface of the shoulder portion of the coupling on the inner peripheral side, the groove, etc, whenever necessary. As the soft synthetic resin ring moves inside the recess defined by the distal end surfaces of each pin and the reduced diameter inner peripheral surface of the coupling, etc, corrosion by the corrosive fluid can be prevented even when the corrosive fluid comes into contact with the distal end surfaces of the pin, etc.

The thickness of the coating layer ($t_2$) is not particularly limited. When the synthetic resin is used for the coating layer, for example, the thickness is preferably within the range of 0.1 mm≦$t_2$≦0.8 mm, and when the fiber-reinforced plastics are used for the coating layer, the thickness is preferably within the range of 0.2 mm≦$t_2$≦2.5 mm. If the thickness of the synthetic resin is less than 0.1 mm when the synthetic resin is used for the coating layer, defects such as pores are likely to occur and hence, reliability such as damage resistance is likely to drop. If the thickness exceeds 0.8 mm, the production cost tends to increase, and both of these cases are not desirable. Further, when the fiber-reinforced plastics are used for the coating layer, natural gas is likely to permeate and to corrode the coating layer if the thickness is less than 0.2 mm when this natural gas flows. If the thickness exceeds 2.5 mm, the soft synthetic resin ring swells out into the tubing because the depth of the recess defined by the distal end surfaces of each pin and the reduced diameter inner peripheral surface of the coupling, for inserting the soft synthetic resin ring, is generally 2.5 mm. In consequence, a drift is hooked up by this soft synthetic resin ring during the drift operation and the working factor is likely to drop. Therefore, both of these cases are not desirable.

According to the second characterizing feature, even when a so-called "back pressure" is applied to the ring as the pressure of the pressure medium inside the tubing drops with respect to the pressure of the pressure medium entering the gap defined between the recess and the ring inserted into the recess, the recess whose gap is progressively narrowed into the tube and the ring are allowed to interfere with each other, so that so-called "looping" or jump out of the ring into the tubing, can be prevented. Furthermore, even when an excessively large compressive force is applied to the ring in the same direction as the axial direction of the pin (hereinafter called the "axial direction") at the time of makeup of the oil well pipe threaded joint, the recess whose gap is narrowed towards the inside of the tube and the ring are allowed to interfere with each other, so that so-called "squeezing" or swell-out of the ring into the tubing can be prevented.

Each step surface of the protuberance portion of the coupling and the distal end surface of each pin are inclined at an acute angle with respect to the inner peripheral surface of each pin, the gap between the distal end surface of each pin and the step surface of the protuberance portion of the coupling can be narrowed towards the inner peripheral surface of each pin inside the recess defined by the distal end surface of each pin, the step surface of the protuberance portion of the coupling and the reduced diameter inner peripheral surface for inserting the ring. Therefore, when each pin is connected by interposing the ring between each step surface of the protuberance portion of the coupling and the distal end surface of each pin, too, looping and squeezing can be prevented in the same way as described above.

Further, in the oil well pipe threaded joint having the construction wherein the ring is interposed between the distal end surface of one of the pins and the step surface of the other pin, the distal end surface of one of the pins and the step surface of the other pin are inclined at an acute angle with respect to the inner peripheral surface of each pin. Therefore, in the recess defined by the distal end surface of one of the pins and the step surface and the flat surface of the other pin, the gap between the distal end surface of one of the pins and the step surface of the other pin can be narrowed towards the inner peripheral surface of each pin.

Further, each step surface of the shoulder portion of the coupling on the inner peripheral side is inclined at an obtuse angle to the inner peripheral surface of each pin and at substantially equal angle of inclination to that of the step surface of the shoulder portion of the opposed coupling on the inner peripheral side. Therefore, the step surface of the coupling and the step surface of each pin can be engaged with each other. Therefore, even when any load is applied to the ring in the inner direction of the tube due to the back pressure at the time of fluctuation of the internal pressure of the tube or compressive force in the axial direction that is applied at the time of makeup to the distal end portion having a reduced thickness for forming the outer peripheral side shoulder portion of each pin (hereinafter called the "reduced thickness portion"), for example, the reaction is allowed to act in the opposite direction to the direction of the application of the load because the step surface of the coupling and the step surface of each pin are engaged with each other.

Further, because the coating layer is applied to at least the inner peripheral surface of the protuberance portion of the coupling on the reduced diameter side and to the inner peripheral surface of each pin, the inner peripheral surface of the tubing is protected by the material having the oil resistance and the corrosion resistance and erosion can be prevented even when injection water having a large oxygen content is injected into the tubing using the oil well pipe threaded joint applied to a water injection well.

As shown in FIGS. 19(a) and 19(b), the oil well pipe threaded joint 10 according to the fifth embodiment of the present invention includes pins 11a and 12a of two pipes 11 and 12 and a coupling 13 for interposing and screwing a ring 14 between the distal end surfaces 11g and 12g of the pins 11a and 12a. Hereinafter, this embodiment will be explained in further detail.

Each pipe is molded from various steel materials having high oil resistance and high corrosion resistance such as a 13Cr steel into an elongated and hollow (or cylindrical) shape. A step portion (hereinafter called the "shoulder portion on the outer peripheral side" or the "step-like shoulder portion") 11b, 12b is formed in the proximity of the end portion of each pipe 11, 12. The large diameter outer peripheral surface 11c, 12c defined by this shoulder portion 11b, 12b on the outer peripheral side is shaped into a slope surface whose outside diameter progressively decreases towards the step surface (hereinafter called the "torque shoulder surface") of the shoulder portion 11b, 12b on the outer peripheral side with a taper of 1/16 with reference to a buttless joint stipulated by the American Petroleum Institute (API). An outside thread 11e, 12e comprising a trapezoidal thread or an external thread such as a hook thread is formed on each slope surface 11c, 12c in the spaced-apart relation from the torque shoulder surface 11d, 12d.

On the other hand, the reduced diameter outer peripheral surface 11f, 12f defined by the shoulder portion 11b, 12b on the outer peripheral side is shaped into a flat slope surface (hereinafter called the "seal surface") whose outside diameter progressively decreases from the side of the torque shoulder surface 11d, 12d towards the distal end surface 11g, 12g with a taper of 1/10. The distal end surface 11g, 12g opposing the ring 14 has a predetermined angle of inclination ($\alpha=75°$).

The coupling 13 is molded from various steel materials having high oil resistance and high corrosion resistance into a hollow shape having a shape of a short shaft and having substantially the same inside diameter as the outside diameter of each pipe 11, 12. A shoulder portion 13b on the inner peripheral side having a substantially rectangular sectional shape is so formed on a substantial center peripheral surface of the coupling 13 as to protrude into the coupling 13.

In order to insert the ring 14 into this substantial center inner peripheral surface, a groove 13f having an outside diameter somewhat smaller than the outside diameter of the ring 14 is formed. Incidentally, both side surfaces of the shoulder portion 13b on the inner peripheral side, which come into contact with the torque shoulder surfaces 11d, 12d of the pins 11a, 12a will be hereinafter called the "torque shoulder surfaces 13d and 13d'".

An inside thread 13h, 13h' comprising an internal thread such as a trapezoidal thread, a hook thread, etc, is formed on each slope surface 13g, 13g' so as to engage with the outside thread 11e, 12e of each pin 11a, 12a.

A ring 14 shaped into a substantially ring-like shape from a material having high oil resistance and high corrosion resistance such as a composite material consisting of polytetrafluoroethylene (PTFE: Teflon (trade name), for example) and 25 wt % of a glass fiber in match with the shape or the size of the coupling 13 is interposed between the distal end surfaces 11g and 12g of the pins 11a and 12a opposing each other while a part of the ring 14 is inserted into the groove 13f of the coupling 13.

Next, the makeup method of the oil well pipe threaded joint 10 according to the fifth embodiment of the present invention will be explained subsequently.

First, the ring 14 is fitted to the groove 13f of the coupling 13. Next, the outside thread 11e of one of the pins 11a is engaged with, and fastened to, one of the inside screws 13*h* of the coupling 13 to a predetermined fastening torque. As the coupling 13 and the pin 11*a* are fastened, the seal surface 11*f* of the pin 11*a* is fastened to the seal surface 13*e* of the coupling 13, their mutual contact area increases and at the same time, their mutual contact surface stress (hereinafter called the "seal surface stress") increases, too. As fastening proceeds further, the torque shoulder surface 11*d* of the pin 11*a* comes into contact with the torque shoulder surface 13*d* of the shoulder portion 13*d* on the inner peripheral side of the coupling 13. As a result, a metal seal is formed by the seal surface 11*f* of the pin 11*a* and the seal surface 13*e* of the coupling 13.

Next, the outside thread 12*e* of the other pin 12*a* is engaged with the other inside thread 13*h*' of the coupling 13. The metal seal is hereby formed by the seal surface 12*f* of the pin 12*a* and the seal surface 13*e*' of the coupling 13 in the same way as described above. In this way, the makeup work by the oil well pipe threaded joint 10 according to the fifth embodiment of the present invention is completed.

If the distal end portion of each pin is inclined at an acute angle in this instance, even when a pressure is applied in the direction A' represented by an arrow in FIG. 19(*b*), the recess 15 whose gap t is narrowed in the inside direction of the tube and the ring 14 can interfere with each other because the distal end surface 11*g*, 12*g* of each pin 11*a*, 12*a* is inclined and as a result, the ring 14 can be prevented from jumping into the tubing, and the ring can be always clamped (or fitted) into the recess portion 15.

When the torque shoulder surface 11*d*, 12*d* of each pin 11*a*, 12*a* come into abutment with the torque shoulder surface 13*d*, 13*d*' of the coupling 13, the fastening torque at the time of makeup and the overload torque due to excessive fastening at this time are absorbed by the shoulder portions 11*b*, 12*b* of the pins 11*a*, 12*a* on the outer peripheral side and the shoulder portion 13*b* of the coupling 13 on the inner peripheral side, in comparison with the case where the distal end surfaces 11*g* and 12*g* of the pins 11*a* and 12*a* are merely brought into abutment, and no influences are exerted on the metal seal. Needless to say, the compressive ratio of the ring 14 can be correctly controlled by suitably controlling the taper of each seal surface 13*e*, 13*e*' of the shoulder portion 13*b* of the coupling 13 on the inner peripheral side and the tolerance of the taper of the seal surfaces 11*f* and 12*f* of the pins 11*a* and 12*a*.

The difference of the oil well pipe threaded joint 20 according to the sixth embodiment of the present invention from that of the fifth embodiment resides in that a protuberance portion 13*i* having a substantially inverted trapezoidal sectional shape is so formed as to extend from the substantial center peripheral surface of the shoulder portion 13' of the coupling 13' on the inner peripheral side to the inner direction of the oil well pipe threaded joint 20 as shown in FIGS. 20(*a*) and 20(*b*). By the way, a groove 13*f*, 13*f*' is formed at each proximal end portion of the protuberance portion 13*i*, and each ring 14, 14' is interposed between each side surface (hereinafter called the "step surface") of the protuberance portion 13*i* and the distal end surface 11*g*, 12*g* of each pin 11*a*, 12*a*. The reduced diameter inner peripheral surface 13*k* of this protuberance portion 13*i* exists on substantially the same plane as the inner peripheral surface 11*i*, 12*i* of each pin 11*a*, 12*a*. Further, each step surface 13*j*, 13*j*' of the protuberance portion 13*i* has a predetermined angle of inclination ($\alpha=80°$) with respect to the inner peripheral surface 11*i*, 12*i* of each pin 11*a*, 12*a*, or in other words, it is disposed at an acute angle.

As a result, the pressure inside the pipe drops with respect to the pressure of the pressure medium entering the gap occurring between each recess 15*a*, 15*b* and each ring 14 fitted into the recess 15*a*, 15*b*, and the back pressure is applied to each ring 14, 14', thereby pressing the ring 14, 14' in the direction B', B" indicated by arrows in FIG. 20(*b*), or the compressive force is applied to the ring 14, 14' in the axial direction during the makeup operation. Even in such cases, each ring 14, 14' is allowed to interfere with each recess 15*a*, 15*b* whose gap t is narrowed. In consequence, it becomes possible to prevent each ring 14, 14' from jumping into the tubing or from swelling out. In other words, each ring can be always clamped inside each recess 15*a*, 15*b*.

In the oil well pipe threaded joint 30 according to the present invention, the ring 14 is interposed and engaged between the distal end surface 21*g* of one of the pipes 21 and the step surface 22*j* of the pin 22*a* of the other pipe 22 as shown in FIGS. 21(*a*) and 21(*b*).

The portion in the proximity of the end portion of each pipe 21, 22 is hot machined (hereinafter called "upsetting") so as to form a thick portion 21*b*, 22*b*. A step portion (hereinafter called the "shoulder portion on the outer peripheral side") 21*c* is formed on the outer peripheral surface of the thick portion 21*b* of one of the pipes 21. Further, a flat surface (which is also called the "seal surface") 21*e* is formed on the slope surface 21*d* on its distal end surface 21*g* side, and an outside thread 21*f* consisting of an external thread is formed at other portions. Further, the distal end surface 21*g* is inclined at an acute angle with a predetermined angle of inclination ($\alpha=70°$) with respect to the inner peripheral surface 21*h* of the pipe 21.

A step portion (hereinafter called the "shoulder portion on the inner peripheral side") 22*c* is formed on the inner peripheral surface of the thick portion 22*b* of the other pipe 22. An inside thread engaging with an outside thread 21*f* of one of the pins 21 is formed on a large diameter inner peripheral surface 22*d* formed by this shoulder portion 22*c* on the inner peripheral side, on the distal end surface 22*g* side of the pipe 22, and a flat surface (hereinafter called the "seal surface") which comes into close contact with the seal surface 21*e* of one of the pins 21*a* and forms a metal seal is formed at the depth (or inside) the pipe 22.

When the outside thread 21*f* of one of the pins 21*a* and the inside thread 22*f* of the other pin 22*a* are engaged with each other by interposing the ring 14 between the distal end surface 21*g* of one of the pins 21 and the step surface 22*j* of the other pin 22*a*, the seal surfaces 21*e* and 22*e* of the pins 21*a* and 22*a* come into intimate contact with each other and form the metal touch, thereby accomplishing the construction of the oil well pipe screw joint 30 according to the seventh embodiment of the present invention.

Even when the back pressure is applied to the ring 14 as the pressure inside the pipe drops with respect to the pressure of the pressure medium entering the gap (not shown) occurring between the recess 15*c* and each ring 14 fitted into the recess 15*c* at the time of the makeup operation and the ring 14 is pressed in the direction C' indicated by the arrow in FIG. 21(*b*) or even when the compressive force is applied to the ring in the axial direction during the makeup operation, the ring 14 is allowed to interfere with each recess 15*c* whose gap t is narrowed. In this way, the ring 14 can be prevented from jumping into the tubing or swelling, and can be always kept fitted into the recess 15*c*.

The difference of the oil well pipe threaded joint 40 according to the eighth embodiment of the present invention from the fifth embodiment resides in that each torque shoulder surface 13*d*, 13*d*' of the shoulder portion 13*b* of the coupling 13" on the inner peripheral side is inclined at an obtuse angle with respect to the inner peripheral surface 11*i*, 12i of each pin 11a, 12a with a predetermined angle of inclination (β=105°), and the torque shoulder surface 11d, 12d of the shoulder portion of each pin 11a, 12a on the outer peripheral side is inclined at substantially the same angle of inclination as that of each torque shoulder surface 13d, 13d' of the coupling 13", so as to thereby engage each torque shoulder surface 13d, 13d' of the coupling 13" with the torque shoulder surface 1id, 12d of each pin 11a, 12a as characteristic points, as shown in FIGS. 22(a) and 22(b).

Next, the oil well pipe threaded joint according to the ninth embodiment of the present invention will be explained. As shown in FIG. 23, a coating layer 16 made of a synthetic resin or a fiber-reinforced plastic having high oil resistance arid corrosion resistance is applied to the inner peripheral surface 11i, 12i of each pin 11a, 12a and to its distal end surface 11g, 12g.

Since the coating layer 16 is applied to the inner peripheral surface 11j, 12j of each pin 11a, 12a, the oil resistance and the corrosion resistance to a corrosive fluid such as a crude oil can be improved. Furthermore, since the coating layer 16 is applied to the distal end surface 11g, 12g of each pin 11a, 12a, possible corrosion inside the recess 15 can be reduced to minimum even when the ring 14 moves inside the recess 15 due to the back pressure, etc, and each distal end surface 11g, 12g is exposed.

Figure 24:
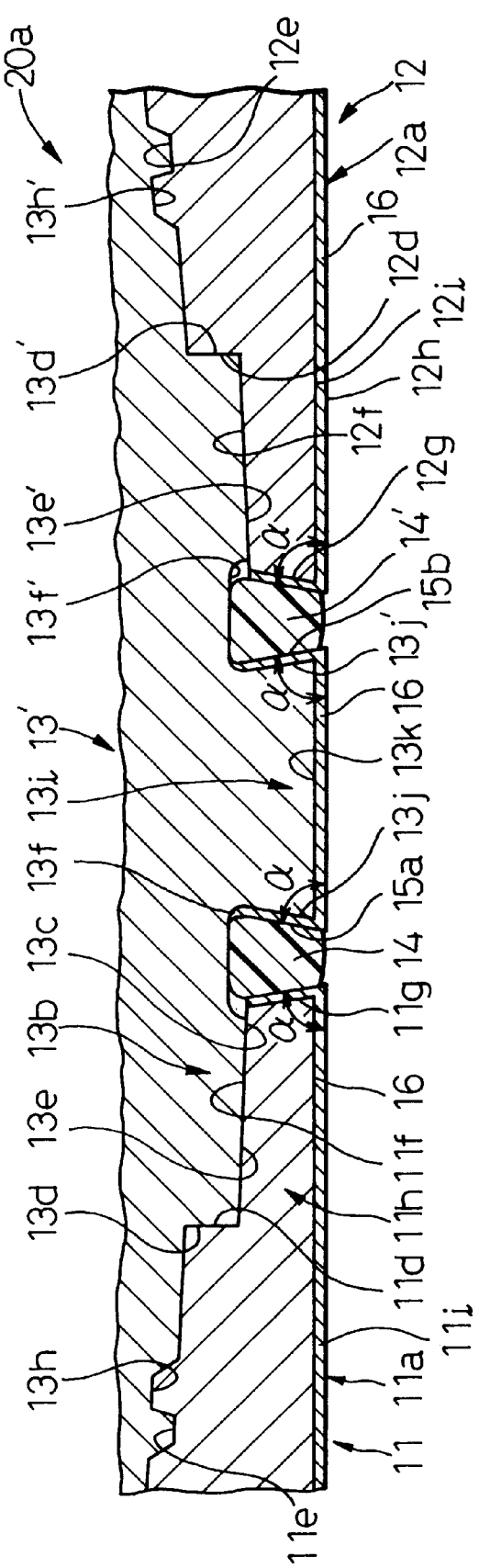
FIG. 24 is an enlarged sectional view of the principal portions of an oil well pipe threaded joint according to the tenth embodiment of the present invention.

The difference of the oil well pipe 20a according to the tenth embodiment of the present invention from the sixth embodiment resides in that, as shown in FIG. 24, a coating layer made of a material having a high oil resistance and a high corrosion resistance such as a synthetic resin or a fiber-reinforced plastic is applied not only to the inner peripheral surface 11i, 12i and distal end surface 11g, 12g of each pin 11a, 12a but also to the reduced diameter side inner peripheral surface 13k and each step surface 13j, 13j' of the protuberance portion of the coupling 13' as characteristic points. As a result, the same effect as that of the ninth embodiment can be obtained.

Figure 25:
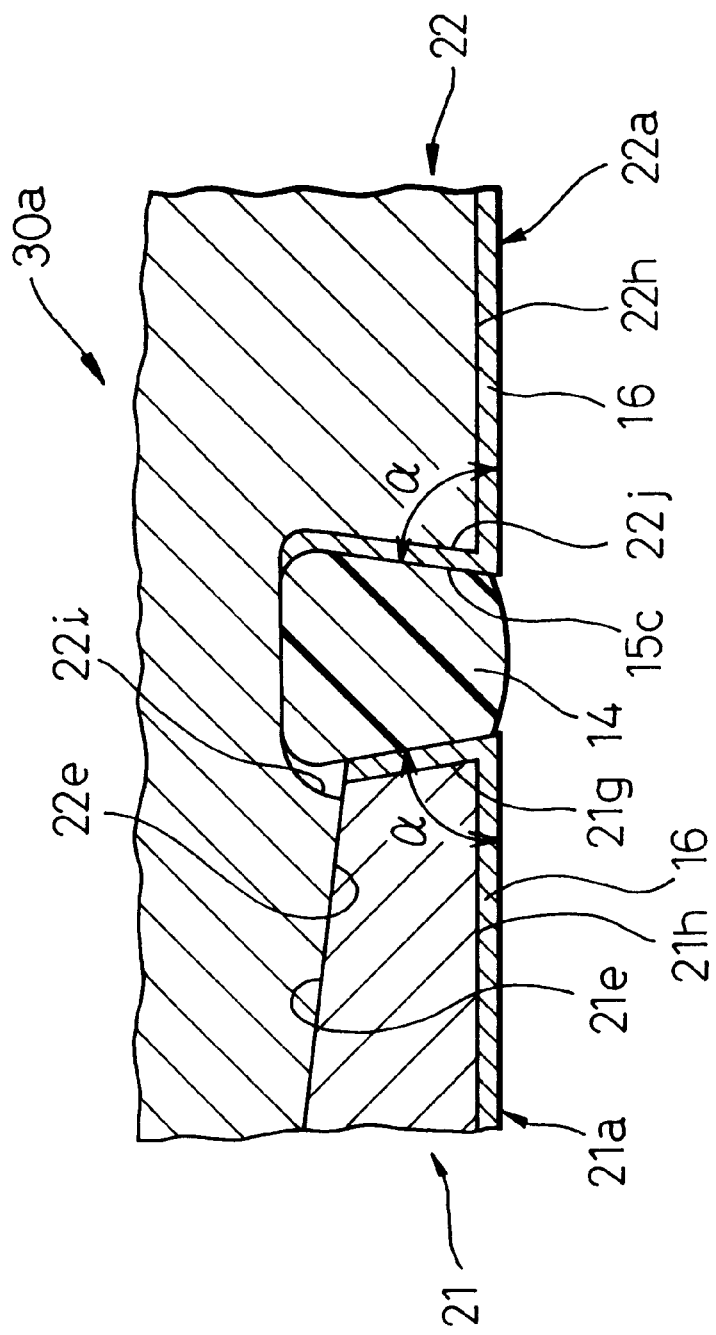
FIG. 25 is an enlarged sectional view showing the principal portions of an oil well pipe threaded joint according to the eleventh embodiment of the present invention.

Next, the oil well pipe threaded joint according to the eleventh embodiment of the present invention will be explained. The difference of the oil well pipe threaded joint 30a according to the eleventh embodiment from the seventh embodiment resides in that, as shown in FIG. 25, a coating layer 16 made of a material having a high oil resistance and a high corrosion resistance such as a synthetic resin or fiber-reinforced plastic is applied to the inner peripheral surface 21h, 22h of each pin 21a, 22a, to the distal end surface 21g of one of the pins 21a and to the step surface 22j of the other pin 22a. As a result, the result as that of the ninth embodiment can be obtained.

Figure 26:
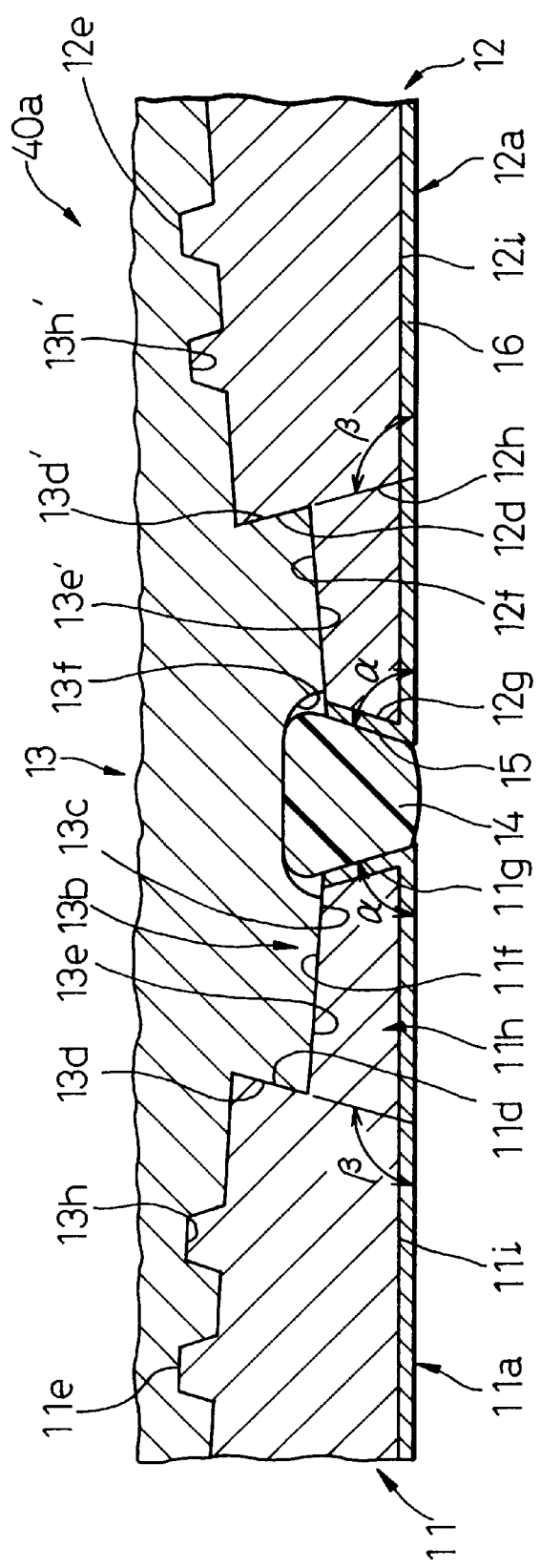
FIG. 26 is an enlarged sectional view showing the principal portions of an oil well pipe threaded joint according to the twelfth embodiment of the present invention.

The difference of the oil well pipe threaded joint according to the twelfth embodiment of the present invention from the eighth embodiment resides in that, as shown in FIG. 26, a coating layer made of a material having a high oil resistance or a high corrosion resistance such as a synthetic resin or fiber-reinforced plastic is applied Lo the inner peripheral surface 11i, 12i and the distal end surface 11g, 12g of each pin 11a, 12a. As a result, the same effect as that of the ninth embodiment can be obtained.

Since the oil well pipe threaded joint according to the present invention can prevent looping and squeezing, catching of a cleaning tool, etc, can be prevented during the logging operation, and can prevent the distal end surface of each pin and the reduced diameter inner peripheral surface of the coupling constituting the recess for the soft synthetic resin ring from coming into contact with the corrosion fluid such as the crude oil inside the tubing. As a result, damage such as corrosion by the corrosive fluid can be prevented.

We claim:

1. An oil well pipe threaded joint comprising:

a coupling having an axial direction and a first end region, a central region, and a second end region adjacently disposed in the axial direction of said coupling;

said coupling having a large diameter threaded inner peripheral surface at said first end region and said second end region;

said coupling having a reduced diameter smooth inner peripheral surface at said central region;

a radially disposed first coupling shoulder portion located between the first end region and the central region of said coupling;

a radially disposed second coupling shoulder portion having an outside diameter located between the second end region and the central region of said coupling;

a first pin having a distal end with a radially disposed first distal end surface, a reduced outside diameter smooth surface distal end region, and an adjacent large outside diameter threaded surface region, with a radially disposed first pin step portion located between said smooth surface distal end region and said threaded surface region;

a second pin having a distal end with a radially disposed second distal end surface, a reduced outside diameter smooth surface distal end region, and an adjacent large outer diameter threaded surface region, with a radially disposed second pin step portion located between said smooth surface distal end region and said threaded surface region;

said first pin threaded surface region engaging said coupling first end threaded surface, said first pin smooth surface distal end region contacting said coupling smooth surface central region with said first coupling shoulder portion abutting said first pin step portion;

said second pin threaded surface region engaging said coupling second end threaded surface, said second pin smooth surface distal end region contacting said coupling smooth surface central region with said second coupling shoulder portion abutting said second pin step portion;

said radially disposed first distal end surface spaced from said radially disposed second distal end surface thereby providing a space therebetween;

a first recess located in said reduced diameter central region of said coupling between said radially disposed first coupling shoulder and said radially disposed second coupling shoulder;

a soft synthetic resin ring having an outside diameter interposed in said space between said radially disposed first distal end surface and said radially disposed second distal end surface;

said first recess having an inner peripheral surface defined by a groove having a diameter larger that the outside diameter of said soft synthetic resin ring;

a second recess having an inner peripheral surface defined by a groove having a diameter larger than the outside diameter of the second shoulder at the second shoulder;

said soft synthetic resin ring having a compressive ratio in an axial direction falling within a range expressed by the following inequality (1):

$$18{,}000/E \leq \text{compressive ratio } (\%) < 0.038^{-1} \times \ln(1 - \{(d_1 - d_2) + 0.36\}/0.25t_1) \quad (1)$$

where E: elastic modulus MPa,
$d_1$: inside diameter of pin mm,
$d_2$: inside diameter of soft synthetic ring mm,
$t_1$: thickness of distal end of pin mm.

2. An oil well pipe threaded joint according to claim 1 further comprising:

a coating layer disposed on an inner peripheral surface of each of said first and said second pins; and said soft synthetic resin ring has a compressive ratio in an axial direction falling within a range expressed by the following inequality (2):

$$18{,}000/E \leq \text{compressive ratio } (\%) < 0.038^{-1} \times \ln(1 - \{(d_1 - 2t_2 - d_2) + 0.36\}/0.25t_1) \quad (2)$$

where E: elastic modulus MPa,
$d_1$: inside diameter of pin mm,
$d_2$: inside diameter of soft synthetic ring mm,
$t_1$: thickness of distal end of pin,
$t_2$: thickness of coating layer.

3. An oil well pipe threaded joint according to claim 2, wherein said coating layer is a material selected from the group consisting of synthetic resin, synthetic rubber and fiber-reinforced plastic.

4. An oil well pipe threaded joint according to claim 1 further comprising:

said soft synthetic resin ring having a compressive ratio in the axial direction falling within a range expressed by the following inequality (3):

$$18{,}000/E \leq \text{compressive ratio } (\%) < 0.038^{-1} \times \ln(1 - \{(d_1 - d_2) + 0.36 + (d_3 - d_4)\}/0.25t_1) \quad (3)$$

where E: elastic modulus MPa,
$d_1$: inside diameter of pin mm,
$d_2$: inside diameter of soft synthetic resin ring mm,
$d_3$: outside diameter of soft synthetic resin ring mm,
$d_4$: inside diameter of groove mm,
$t_1$: thickness of distal end of pin mm.

5. An oil well threaded joint according to claim 4 further comprising:

a coating layer disposed on an inner peripheral surface of each of said first and second pins;

said soft synthetic resin ring having a compressive ratio in the axial direction falling within a range expressed by the following inequality (4):

$$18{,}000/E \leq \text{compressive ratio } (\%) < 0.038^{-1} \times \ln(1 - \{(d_1 - 2t_2 - d_2) + 0.36 + (d_3 - d_4)\}/0.25t_1) \quad (4)$$

where E: elastic modulus MPa,
$d_1$: inside diameter of pin mm,
$d_2$: inside diameter of soft synthetic resin ring mm,
$d_3$: outside diameter of soft synthetic resin ring mm,
$d_4$: inside diameter of groove mm,
$t_1$: thickness of distal end of pin mm,
$t_2$: thickness of coating layer mm.

6. An oil well pipe threaded joint according to claim 1 wherein said soft synthetic resin ring is polytetrafluoroethylene containing 10 to 30 wt. % of at least one of glass fiber and fluororesin.

7. An oil well pipe threaded joint comprising:

a coupling having an axial direction and a first end region, a central region, and a second end region adjacently disposed in the axial direction of said coupling;

said coupling having a large diameter threaded inner peripheral surface at said first end region and said second end region;

said coupling having a reduced diameter smooth inner peripheral surface at said central region;

a radially disposed first coupling shoulder portion located between the first end region and the central region of said coupling;

a radially disposed second coupling shoulder portion having an outside diameter located between the second end region and the central region of said coupling;

a first pin having a distal end with a radially disposed first distal end surface, a reduced outside diameter smooth surface distal end region, and an adjacent large outside diameter threaded surface region, with a radially disposed first pin step portion located between said smooth surface distal end region and said threaded surface region;

a second pin having a distal end with a radially disposed second distal end surface, a reduced outside diameter smooth surface distal end region, and an adjacent large outer diameter threaded surface region, with a radially disposed second pin step portion located between said smooth surface distal end region and said threaded surface region;

said first pin threaded surface region engaging said coupling first end threaded surface, said first pin smooth surface distal end region contacting said coupling smooth surface central region with said first coupling shoulder portion abutting said first pin step portion;

said second pin threaded surface region engaging said coupling second end threaded surface, said second pin smooth surface distal end region contacting said coupling smooth surface central region with said second coupling shoulder portion abutting said second pin step portion;

said radially disposed first distal end surface spaced from said radially disposed second distal end surface thereby providing a space therebetween;

a first recess located in said reduced diameter central region of said coupling between said radially disposed first coupling shoulder and said radially disposed second coupling shoulder;

a resin ring having an outside diameter interposed in said space between said radially disposed first distal end surface and said radially disposed second distal end surface;

said first recess having an inner peripheral surface defined by a groove having a diameter larger that the outside diameter of said resin ring;

a second recess having an inner peripheral surface defined by a groove having a diameter larger than the outside diameter of said second shoulder at the second shoulder;

said radially disposed first distal end surface being inclined at an acute angle to the inner peripheral surface of said first pin and said radially disposed second distal end surface being inclined at an acute angle to the inner surface of said second pin.

8. An oil well pipe threaded joint according to claim 7 further comprising:

each recess having a first radially disposed side and a second radially disposed sided axially spaced from said first radially disposed side, with said first radial disposal side and said second radially disposed side of of each recess each inclined at an acute angle with respect to the inner peripheral surface of both of said pins.

9. An oil well pipe threaded joint according to claim 8 further comprising:

a coating layer disposed on the inner peripheral surface of said first pin and said second pin.

10. An oil well pipe threaded joint according to claim 7 further comprising:

said radially disposed first coupling shoulder portion having an outer surface inclined at an obtuse angle to the inner peripheral surface of said first pin;

said radially disposed second coupling shoulder portion having an outer surface inclined at an obtuse angle to the inner peripheral surface of said second pin;

with the radial disposed first distal end surface of the first pin and the radial disposed second distal end surface of the second pin having an angle of inclination substantially equal to the angle of inclination of the outer surfaces of said first and second radially disposed first and second coupling shoulder portions.

* * * * *

UNITED STATES PATENT AND TRADEMARK OFFICE
CERTIFICATE OF CORRECTION

PATENT NO. : 6,176,524 B1
DATED : January 23, 2001
INVENTOR(S) : Eiji Tsuru et al.

It is certified that error appears in the above-identified patent and that said Letters Patent is hereby corrected as shown below:

Column 4,
Line 8, change "arid" to -- and --;

Column 7,
Line 45, change "11" to -- H --;

Column 12,
Line 25, change "welt" to -- well --;
Line 51, change "$d8_1$" to -- $d8_2$ --.

Column 14,
Line 36, change "Joint" to -- joint --.

Column 21,
Line 14, change "arid" to -- and --.

Signed and Sealed this

First Day of January, 2002

Attest:

JAMES E. ROGAN
*Director of the United States Patent and Trademark Office*

*Attesting Officer*